US010337218B2

(12) United States Patent
Do

(10) Patent No.: US 10,337,218 B2
(45) Date of Patent: Jul. 2, 2019

(54) HANDLE MECHANISMS

(71) Applicant: Alcoa Inc., Pittsburgh, PA (US)

(72) Inventor: Thai Do, Laguna Niguel, CA (US)

(73) Assignee: Arconic Inc., Pittsburgh, PA (US)

( * ) Notice: Subject to any disclaimer, the term of this patent is extended or adjusted under 35 U.S.C. 154(b) by 312 days.

(21) Appl. No.: 15/204,120

(22) Filed: Jul. 7, 2016

(65) Prior Publication Data
US 2017/0009500 A1    Jan. 12, 2017

Related U.S. Application Data

(60) Provisional application No. 62/189,994, filed on Jul. 8, 2015, provisional application No. 62/198,335, filed
(Continued)

(51) Int. Cl.
*E05B 13/00* (2006.01)
*E05B 5/02* (2006.01)
(Continued)

(52) U.S. Cl.
CPC ............. *E05C 5/02* (2013.01); *E05B 5/003* (2013.01); *E05B 13/002* (2013.01); *E05C 3/004* (2013.01);
(Continued)

(58) Field of Classification Search
CPC .... Y10S 292/31; Y10T 292/03; Y10T 292/57; Y10T 292/93; E05B 5/003; E05B 13/002; E05B 13/004; E05C 1/065
(Continued)

(56) References Cited

U.S. PATENT DOCUMENTS 643,957 A * 2/1900 Fergusson ............... E05B 37/02
                                                          292/2
932,330 A * 8/1909 Rotchford ........... E05B 65/0075
                                                          292/2
(Continued)

FOREIGN PATENT DOCUMENTS

CN    202249170 U    5/2012
CN    206000260 U    3/2017
(Continued)

OTHER PUBLICATIONS

International Search Report and Written Opinion dated Oct. 6, 2016, issued by the European Patent Office in International Patent Application No. PCT/US2016/041315 filed Jul. 7, 2016 (11 pages).
(Continued)

*Primary Examiner* — Carlos Lugo
(74) *Attorney, Agent, or Firm* — Greenberg Traurig, LLP

(57) ABSTRACT

A handle mechanism includes a gear drive having an interior end and an exterior end; an inside handle fixed to the interior end; a button; a finger; a handle drive; an outside handle; and a spring. The button has an interior end and an exterior end, which is positioned within the exterior end of the gear drive. The handle drive is positioned within the exterior end of the gear drive and is rotatable relative thereto. The outside handle and the handle drive rotate together. The outside handle moves between a first position, wherein it is constrained from rotation, and a second position. The finger is fixed to the exterior end of the button, which moves between a first position, wherein the finger causes the gear drive and the handle drive to rotate together, and a second position. The spring biases the button and the outside handle toward their first positions.

13 Claims, 14 Drawing Sheets

Related U.S. Application Data on Jul. 29, 2015, provisional application No. 62/246,347, filed on Oct. 26, 2015.

(51) Int. Cl.
| | |
|---|---|
| *E05C 5/02* | (2006.01) |
| *E05C 3/00* | (2006.01) |
| *E05C 3/12* | (2006.01) |
| *E05C 3/14* | (2006.01) |
| E05C 1/06 | (2006.01) |
| E05B 1/00 | (2006.01) |
| B64C 1/14 | (2006.01) |

(52) U.S. Cl.
CPC .............. *E05C 3/122* (2013.01); *E05C 3/145* (2013.01); *B64C 1/1407* (2013.01); *E05B 1/0092* (2013.01); *E05B 13/004* (2013.01); *E05C 1/065* (2013.01); *Y10S 292/31* (2013.01); *Y10T 292/03* (2015.04); *Y10T 292/57* (2015.04); *Y10T 292/93* (2015.04)

(58) Field of Classification Search
USPC ................................. 70/467–489; 292/336.3
See application file for complete search history.

(56) References Cited

U.S. PATENT DOCUMENTS

| | | | | |
|---|---|---|---|---|
| 1,004,690 | A * | 10/1911 | Russell | E05B 63/0017 |
| | | | | 292/150 |
| 1,102,313 | A * | 7/1914 | Yates | E05B 85/22 |
| | | | | 292/172 |
| 1,206,342 | A | 11/1916 | Linborg | |
| 1,618,344 | A * | 2/1927 | Kopp | E05C 1/14 |
| | | | | 292/165 |
| 1,904,763 | A * | 4/1933 | Baume | E05C 1/163 |
| | | | | 292/169.18 |
| 2,104,838 | A | 1/1938 | Leonard | |
| 2,186,865 | A * | 1/1940 | Hubbell | E05B 5/003 |
| | | | | 70/208 |
| 2,239,301 | A * | 4/1941 | Papst | E05B 5/003 |
| | | | | 292/1 |
| 2,246,708 | A * | 6/1941 | Wieben | E05B 85/10 |
| | | | | 292/1 |
| 2,570,160 | A * | 10/1951 | Schoch | E05B 5/003 |
| | | | | 292/1 |
| 2,622,430 | A * | 12/1952 | Adams | E05B 85/22 |
| | | | | 292/153 |
| 2,712,955 | A | 7/1955 | Andrews | |
| 2,726,889 | A | 12/1955 | Lawson | |
| 2,742,314 | A * | 4/1956 | Santos | E05B 13/005 |
| | | | | 292/336.3 |
| 2,783,074 | A * | 2/1957 | Miltner | E05B 13/005 |
| | | | | 292/336.3 |
| 2,800,347 | A * | 7/1957 | Wardwell, Jr. | E05B 55/005 |
| | | | | 292/153 |
| 2,904,141 | A | 9/1959 | Henrichs | |
| 2,927,812 | A | 3/1960 | Smith et al. | |
| 2,944,848 | A | 7/1960 | Mandolf | |
| 3,070,395 | A | 12/1962 | Morrison et al. | |
| 3,206,238 | A * | 9/1965 | Speight | E05B 13/005 |
| | | | | 192/114 R |
| 3,259,411 | A | 7/1966 | Griffiths | |
| 3,259,412 | A | 7/1966 | Wheeler | |
| 3,341,239 | A | 9/1967 | Wheeler | |
| 3,347,578 | A | 10/1967 | Sheehan et al. | |
| 3,473,693 | A | 10/1969 | Fritz | |
| 3,917,327 | A | 11/1975 | Plasko | |
| 4,053,177 | A | 10/1977 | Stammreich et al. | |
| 4,099,751 | A | 7/1978 | Poe et al. | |
| 4,116,479 | A | 9/1978 | Poe | |
| 4,130,307 | A | 12/1978 | Poe et al. | |
| 4,183,564 | A | 1/1980 | Poe | |
| 4,220,364 | A | 9/1980 | Poe | |
| 4,510,779 | A * | 4/1985 | Ahad | E05B 5/00 |
| | | | | 292/DIG. 31 |
| RE31,935 | E | 7/1985 | Poe | |
| 4,530,529 | A | 7/1985 | Poe et al. | |
| 4,538,843 | A | 9/1985 | Harris | |
| 4,602,812 | A | 7/1986 | Bourne | |
| 4,641,868 | A | 2/1987 | Miron | |
| 4,799,371 | A * | 1/1989 | Duncan | E05B 37/16 |
| | | | | 70/214 |
| 4,826,221 | A | 5/1989 | Harmon | |
| 4,828,299 | A | 5/1989 | Poe | |
| 4,858,970 | A | 8/1989 | Tedesco et al. | |
| 4,911,488 | A | 3/1990 | Brackmann et al. | |
| 5,152,926 | A | 10/1992 | Brown | |
| 5,228,730 | A | 7/1993 | Gokcebay et al. | |
| 5,301,989 | A * | 4/1994 | Dallmann | E05B 65/0876 |
| | | | | 292/142 |
| 5,341,752 | A | 8/1994 | Hambleton | |
| 5,509,703 | A * | 4/1996 | Lau | E05C 3/042 |
| | | | | 292/1 |
| 5,609,373 | A | 3/1997 | Gromotka | |
| 5,620,212 | A | 4/1997 | Bourne et al. | |
| 5,660,295 | A | 8/1997 | Hroma et al. | |
| 5,664,813 | A | 9/1997 | Gromotka | |
| 5,947,535 | A * | 9/1999 | Baker | E05C 1/12 |
| | | | | 292/165 |
| 5,984,382 | A | 11/1999 | Bourne et al. | |
| 6,095,573 | A * | 8/2000 | Rozema | E05B 5/003 |
| | | | | 292/336.3 |
| 6,123,370 | A | 9/2000 | Rozema et al. | |
| 6,179,352 | B1 * | 1/2001 | Schneeberger | E05B 13/005 |
| | | | | 292/336.3 |
| 6,343,815 | B1 | 2/2002 | Poe | |
| 6,361,090 | B1 | 3/2002 | Fan | |
| 6,460,904 | B1 * | 10/2002 | Stapf | E05B 85/12 |
| | | | | 292/336.3 |
| 6,755,448 | B2 | 6/2004 | Jackson et al. | |
| 6,843,084 | B2 * | 1/2005 | Porter | E05B 47/0603 |
| | | | | 292/336.3 |
| 6,913,297 | B2 | 7/2005 | Jackson et al. | |
| 7,029,038 | B2 | 4/2006 | Kobrehel | |
| 7,156,429 | B2 | 1/2007 | Eriksson | |
| 7,504,601 | B2 | 3/2009 | Belmond et al. | |
| 7,857,362 | B2 | 12/2010 | Deblock | |
| 8,100,443 | B2 * | 1/2012 | Talpe | E05B 13/005 |
| | | | | 292/336.3 |
| 8,479,543 | B2 | 7/2013 | Yang et al. | |
| 8,646,819 | B2 | 2/2014 | Do et al. | |
| 8,727,390 | B2 | 5/2014 | Do | |
| 8,864,185 | B2 | 10/2014 | Do | |
| 2002/0000726 | A1 | 1/2002 | Zintler | |
| 2002/0060459 | A1 | 5/2002 | Zintler | |
| 2003/0213095 | A1 | 11/2003 | Jackson | |
| 2005/0087996 | A1 | 4/2005 | Jackson et al. | |
| 2006/0214431 | A1 | 9/2006 | Helsley et al. | |
| 2007/0170730 | A1 | 7/2007 | Hall | |
| 2008/0129056 | A1 | 6/2008 | Hernandez et al. | |
| 2011/0109103 | A1 | 5/2011 | Huston et al. | |
| 2012/0102842 | A1 | 5/2012 | Fournie et al. | |
| 2012/0151724 | A1 | 6/2012 | DeFrance et al. | |

FOREIGN PATENT DOCUMENTS

| | | |
|---|---|---|
| DE | 202220 C | 9/1908 |
| DE | 29807738 U1 | 7/1998 |
| EP | 1091059 A2 | 4/2001 |
| EP | 2031157 A1 | 3/2009 |
| FR | 2397503 A1 | 2/1979 |
| FR | 2852049 A1 | 9/2004 |
| GB | 191493 A | 1/1923 |
| GB | 683 445 A | 11/1962 |
| GB | 1497982 A | 1/1978 |
| GB | 1537410 A | 12/1978 |
| GB | 2227518 A | 8/1990 |

(56) References Cited

FOREIGN PATENT DOCUMENTS

| WO | 2010033026 A1 | 3/2010 |
|---|---|---|
| WO | 2010149905 A1 | 12/2010 |

OTHER PUBLICATIONS

Aerospace Latching Systems, Alcoa Fastening Systems, http://www.alcoa.com/fastening_systems/aerospace/en/product.asp?cat_id=213&prod_id=500,pp. I1-2, 159-60, and i-iii (8 pages).

Fairchild Fasteners, Aerospace Mechanisms, "RAM™ Aerospace Latch Mechanism", 2000 (4 pages).

Rotary Latch #TL18261, Alcoa Fastening Systems, Mar. 2005 (1 page).

English-language translation of WO 2010/149905 A1 (8 pages).

International Search Report and Written Opinion dated Jul. 20, 2012, issued by the European Patent Office in connection with International Patent Application No. PCT/US2012/028418 entitled "Pin Latch Having Intermediate Position" (13 pages).

International Search Report and Written Opinion dated Jan. 18, 2013, issued by the European Patent Office in connection with International Patent Application No. PCT/US2012/059206 entitled "Rotary-Handle Latch" (9 pages).

International Search Report and Written Opinion dated Feb. 25, 2013, issued by the European Patent Office in connection with International Patent Application No. PCT/US2012/066039 entitled "Pin Latch With Detection Device and Movable Catch-Pin and Intermediate Position With Automatic Return Mechanism" (15 pages).

International Search Report and Written Opinion dated Dec. 29, 2011, issued by the European Patent Office in connection with International Patent Application No. PCT/US2011/027871 entitled "Latch With Adjustable Handle" (17 pages).

International Search Report and Written Opinion dated Jul. 15, 2011, issued by the European Patent Office in connection with International Patent Application No. PCT/US2011/027671 entitled "Latch With Adjustable Handle" (8 pages).

International Search Report and Written Opinion dated Jun. 7, 2011, issued by the European Patent Office in connection with International Patent Application No. PCT/US2011/024031 entitled "Side-Driven Action Pin Latch" (9 pages).

International Search Report and Written Opinion dated Jun. 9, 2016, issued by the European Patent Office in connection with International Patent Application No. PCT/US2016/024836 (13 pages).

\* cited by examiner

HANDLE MECHANISMS

CROSS-REFERENCE TO RELATED APPLICATIONS

This application is a Section 111(a) application relating to and claiming the benefit of commonly owned, U.S. Provisional Patent Application No. 62/189,994, titled "OUTSIDE HANDLE WITH INSIDE, INDEPENDENT HANDLE MECHANISM," having a filing date of Jul. 8, 2015, U.S. Provisional Patent Application No. 62/198,335, titled "OUTSIDE HANDLE WITH INSIDE, INDEPENDENT HANDLE AND FLAG MECHANISM," having a filing date of Jul. 29, 2015, and U.S. Provisional Patent Application No. 62/246,347, titled "OUTSIDE AND INSIDE HANDLE WITH TILT-OUT MECHANISM," having a filing date of Oct. 26, 2015, the contents of each of which are incorporated by reference herein in their entireties.

FIELD OF THE INVENTION

The present invention relates to door handles and, more particularly, to aerospace door handles.

BACKGROUND OF THE INVENTION

Removable and moveable elements installed on exterior surfaces of aerospace vehicles, such as hatches, fan cowl doors and other doors, access panels, engine cowlings, nacelles, and radomes may employ handle mechanisms. The mechanisms are used with handles to open or close such elements.

SUMMARY OF THE INVENTION

In an embodiment, a handle mechanism includes a housing, a gear drive, an inside handle, a button, a finger, a handle drive, an outside handle, and a spring. The housing has an interior side, an exterior side opposite the interior side, a niche formed in the exterior side, a recess formed in the exterior side at a first end of the niche, and a hole extending through the housing at the recess. The gear drive has an interior end, an exterior end opposite the interior end, a longitudinal axis extending from the interior end to the exterior end, a peripheral surface, and a gear formed within the peripheral surface. The exterior end is positioned with the hole of the housing and is positioned in the recess of the housing. The gear drive is positioned such that the longitudinal axis is perpendicular to the housing. The inside handle is fixed to the interior end of the gear drive. The button is disposed within the gear drive and is oriented substantially parallel to the longitudinal axis of the gear drive. The button has an interior end and an exterior end opposite the interior end of the button. The interior end of the button extends through the inside handle. The exterior end of the button is positioned within the exterior end of the gear drive. The button is slidably movable along the longitudinal axis of the gear drive between a first position and a second position. The finger is fixed to the exterior end of the button. The handle drive is positioned coaxially within the exterior end of the gear drive and is positioned with respect to the gear drive so as to be rotatable relative to the gear drive about the longitudinal axis of the gear drive but constrained from motion relative to the gear drive. The outside handle is fixed to the handle drive such that rotation of one of the outside handle and the handle drive about the longitudinal axis of the gear drive causes corresponding rotation of the other one of the outside handle and the handle drive about the longitudinal axis of the gear drive. The outside handle is movable between a first position, in which the outside handle is positioned within the niche of the housing, and a second position, in which the outside handle is positioned externally of the niche of the housing. When the outside handle is positioned within the niche of the housing, the outside handle is constrained from rotation about the longitudinal axis of the gear drive. The spring is attached to the button so as to bias the button toward the first position of the button. The spring is attached to the outside handle so as to bias the outside handle toward the first position of the outside handle. When the button is in its first position, the finger is engaged with the gear drive and the handle drive such that rotation of one of the gear drive and the handle drive about said longitudinal axis causes corresponding rotation of the other one of the gear drive and the handle drive about the longitudinal axis. When the button is in its second position, the finger is disengaged from the handle drive such that rotation of the gear drive about the longitudinal axis does not cause corresponding rotation of the handle drive about the longitudinal axis.

In an embodiment, the gear of the gear drive is adapted to drive a door mechanism. In an embodiment, the outside handle includes a pin hole and the outside handle is fixed to the handle drive by a pin fixed to the handle drive and passing through the pin hole of the outside handle. In an embodiment, the outside handle is rotatable about the pin to move between the first position of the outside handle and the second position of the outside handle. In an embodiment, the outside handle includes an interior surface, an exterior surface opposite the interior surface, and a button hole extending from the interior surface to the exterior surface. The button hole and the pin hole are positioned so as not to intersect one another. In an embodiment, the exterior end of the button passes through the button hole of the outside handle such that when the button is in its first position, the exterior end of the button is flush with the exterior surface of the outside handle, and such that when the button is in its second position, the exterior end of the button protrudes past the exterior surface of the outside handle. In an embodiment, the exterior end of the button is colored so as to provide a visual indication that the button is in its second position.

In an embodiment, the housing includes a stop positioned in such a manner so as to define an allowable range of rotation of said handle drive about said longitudinal axis of said gear drive with respect to said housing. In an embodiment, the allowable range of rotation of the handle drive extends from a first position, in which a first portion of the handle drive abuts the stop of the housing, to a second position, in which a second portion of the handle drive abuts the stop of said housing. In an embodiment, when the handle drive is positioned in its first position, the handle drive and the finger cooperate to position the gear drive in an open position, and when the handle drive is positioned in its second position, the handle drive and the finger cooperate to position said gear drive in a closed position.

In an embodiment, the handle drive includes a stop positioned in such a manner so as to define an allowable rotation of the gear drive about the longitudinal axis of the gear drive with respect to the handle drive. In an embodiment, the allowable range of rotation of the gear drive extends from a first position, in which a first portion of the gear drive abuts the stop of the handle drive, to a second position, in which a second portion of the gear drive abuts the stop of the handle drive. In an embodiment, when the gear drive is in its first position, the gear of the gear drive is in an open position, and when the gear drive is in its second position, the handle drive and the gear drive cooperate to position the gear of the gear drive in one of the open position and a closed position.

In an embodiment, a handle mechanism includes a housing, a gear drive, an inside handle, a button, an outside handle, and a spring. The housing has an interior side, an exterior side opposite the interior side, a niche formed in the exterior side, a recess formed in the exterior side at a first end of the niche, and a hole extending through the housing at the recess. The gear drive has an interior end, an exterior end opposite the interior end, a longitudinal axis extending from the interior end to the exterior end, a peripheral surface, and a gear formed within the peripheral surface. The exterior end is positioned within the hole of the housing and positioned in the recess of the housing. The gear drive is positioned such that the longitudinal axis is perpendicular to the housing. The inside handle is fixed to the interior end of the gear drive. The button is disposed within the gear drive and is oriented substantially parallel to the longitudinal axis of the gear drive. The button has an interior end and an exterior end opposite the interior end of the button. The interior end of the button extends through the inside handle. The exterior end of the button is positioned within the exterior end of the gear drive. The button is slidably movable along the longitudinal axis of the gear drive between a first position and a second position. The outside handle is fixed to the gear drive such that rotation of one of the outside handle and the gear drive about the longitudinal axis of the gear drive causes corresponding rotation of the other one of the outside handle and the gear drive about the longitudinal axis of the gear drive. The outside handle is movable between a first position, in which the outside handle is positioned within the niche of the housing, and a second position, in which the outside handle is positioned externally of the niche of the housing. When the outside handle is positioned within the niche of the housing, the outside handle is constrained from rotation about the longitudinal axis of the gear drive. The spring is attached to the button so as to bias the button toward the first position of the button. The spring is further attached to the outside handle so as to bias the outside handle toward the first position of the outside handle. When the button is in its first position and the outside handle is in its first position, the exterior end of the button abuts the outside handle. When the button is in its second position, the exterior end of the button urges the outside handle to its second position.

In an embodiment, the housing includes a stop positioned in such a manner so as to define an allowable range of rotation of the gear drive about the longitudinal axis of the gear drive with respect to the housing. In an embodiment, the stop includes a stop pin extending through the housing. In an embodiment, the gear drive includes a stop pin slot formed therein and the stop pin is disposed within the stop pin slot. In an embodiment, the allowable range of motion extends from a first position, in which the stop pin abuts a first end of the stop pin slot, to a second position, in which the stop pin abuts a second end of the stop pin slot. In an embodiment, when the gear drive is in its first position, the gear of the gear drive is in an open position, and when the gear drive is in its second position, the gear of the gear drive is in a closed position.

DETAILED DESCRIPTION OF THE DRAWINGS

Figure 1:
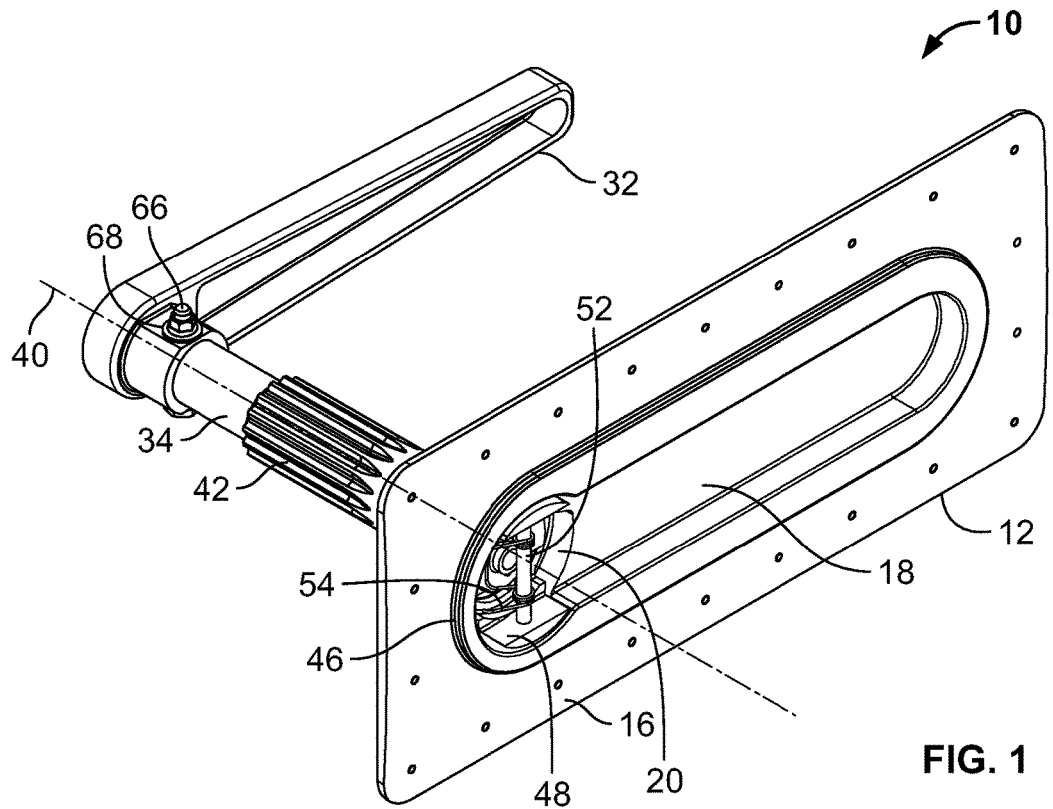
FIG. 1 is a front perspective view of first embodiment of a door handle, an outside handle employed by the door handle having been removed in FIG. 1 to expose and illustrate a handle drive mechanism.
Figure 2:
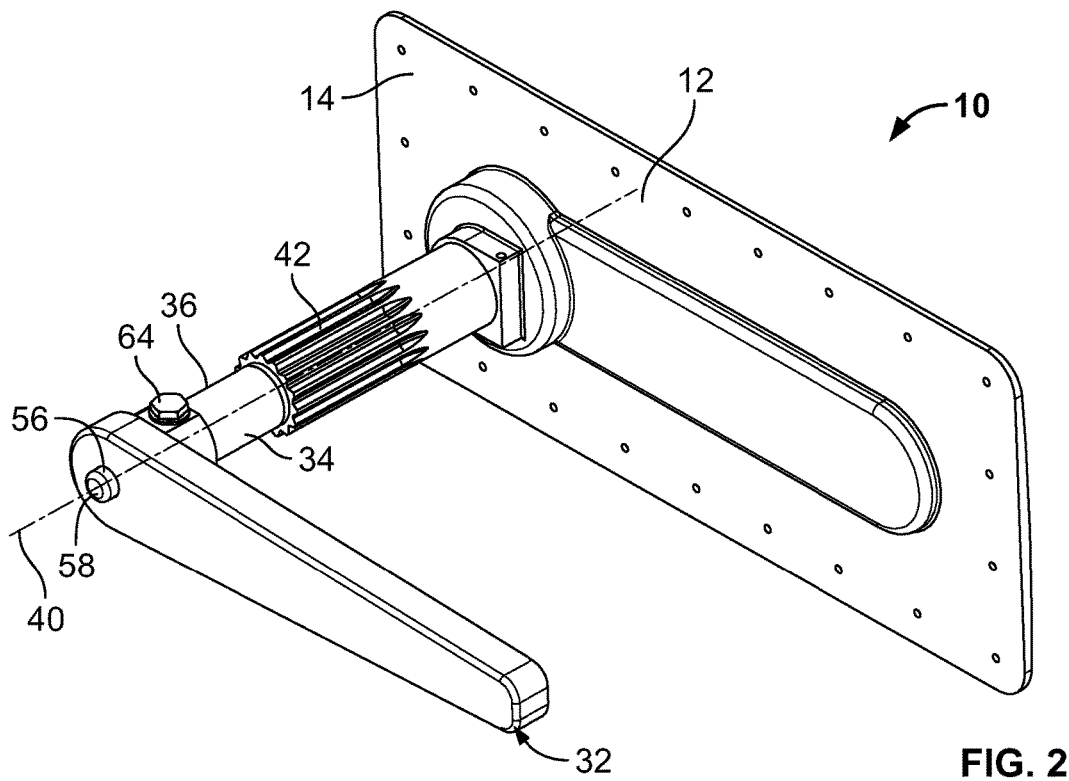
FIG. 2 is a rear perspective view of the door handle shown in FIG. 1.
Figure 3:
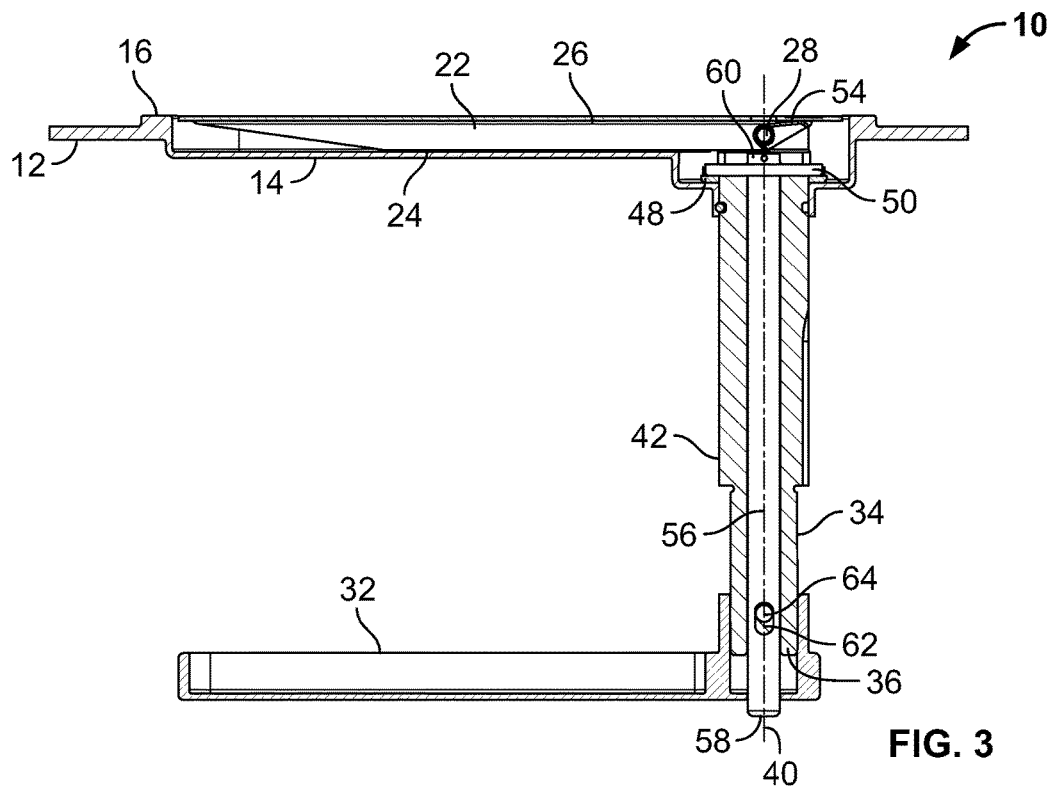
FIG. 3 is a side, cross-sectional view of the door handle shown in FIGS. 1 and 2, the door handle being shown in a closed position.

Referring to FIGS. 1 through 4, in a first embodiment, a door handle 10 includes a substantially planar housing 12 having an interior surface 14 and an exterior surface 16 opposite the interior surface 14. An elongated niche 18 and a circular recess 20 are formed within the exterior surface 16 and are adjacent to one another such that the circular recess 20 is located at one end of the niche 18. An outside (i.e., exterior) handle 22 is housed within the niche 18 of the housing 12 (see FIG. 3). In an embodiment, the niche 18 is sized and shaped so that the outside handle 22 is housed within the niche 18 and is positioned below the exterior surface 16 of the housing 12. In other embodiments, the niche 18 is sized and shaped so that the outside handle 22 is housed within the niche 18 and is either flush or substantially flush with the exterior surface 16 of the housing 12. The outside handle 22 has an interior surface 24, an exterior surface 26 opposite the interior surface 24, and a pin hole 28. The pin hole 28 has a transverse orientation such that it does not pierce the interior or exterior surfaces 24, 26 of the outside handle 22.

An inside (i.e., interior) handle 32 is located on an opposite side of the housing 12 from the outside handle 22. A generally cylindrical gear drive 34 connects the outside handle 22 and the inside handle 32 to one another. The gear drive 34 has an inside end 36 proximate the inside handle 32. The gear drive 34 also has an outside end 38 (see FIG. 10) opposite the inside end 36 and proximate the outside handle 22. A longitudinal axis 40 extends between the inside end 36 and the outside end 38 of the gear drive 34. It will be apparent to those of skill in the art that the longitudinal axis 40 is not a physical feature of the gear drive 34, but, rather, is merely an imaginary point of reference for use in describing the gear drive 34 and the remaining elements of the door handle 10. The gear drive 34 is oriented such that the longitudinal axis 40 is substantially perpendicular to the housing 12. In an embodiment, the gear drive 34 includes a gear 42 formed in a peripheral surface thereof and adapted to drive a separate door mechanism (not shown in the Figures).

In an embodiment, the outside handle 22 is coupled to a handle drive assembly 46, which is positioned within the recess 20 of the housing 12. The handle drive assembly 46 includes a handle drive 48 attached to the outside end 38 of the gear drive 34, a finger 50 attached to the button 56, a pin 52 attached to the handle drive 48, and a torsion spring 54 positioned on the pin 52. The pin 52 is oriented perpendicularly to the longitudinal axis 40 of the gear drive 34. The pin 52 passes through the pin hole 28 of the exterior handle 32 and is fixed to the handle drive 48 at either end thereof, thereby coupling the handle drive assembly 46 to the exterior handle 22.

In an embodiment, the gear drive 34 contains a button 56 extending from an interior end 58 to an exterior end 60 opposite the interior end 58. The interior end 58 passes through the inside handle 32. The exterior end 60 passes through the finger 50 of the handle drive assembly 46 and is adjacent the outside handle 22. A slot 62 passes through the button 56 proximate the interior end 58. In an embodiment, a bolt 64 passes through the inside handle 32 and through the slot 62 of the button 56. In an embodiment, the bolt 64 is secured by a nut 66 and a washer 68, thereby retaining the button 56 and constraining the motion thereof to the travel of the bolt 64 within the slot 62 of the button 56. In an embodiment, the handle drive 48 includes a slot 70 while the outside end 38 of the gear drive 34 includes a slot 72.

In an embodiment, the outside handle 22 is adapted to pivot at one end of the handle drive 48 (i.e., the outside handle 22 pivots about the pin 52), and is spring loaded by the torsion spring 54 so as to be urged toward a position within the niche 18 of the housing 12. In an embodiment, the handle drive 48 is adapted (i.e., sized, shaped, and positioned) in such a manner so as to pivot and float between the housing 12 and the gear drive 34, which is secured within the housing 12. In an embodiment, the housing 12 includes at least one stop 74 positioned so as to limit the rotation of the handle drive 48. In an embodiment, the handle drive 48 includes at least one stop 76 positioned so as to limit the rotation of the gear drive 34.

Figure 5:
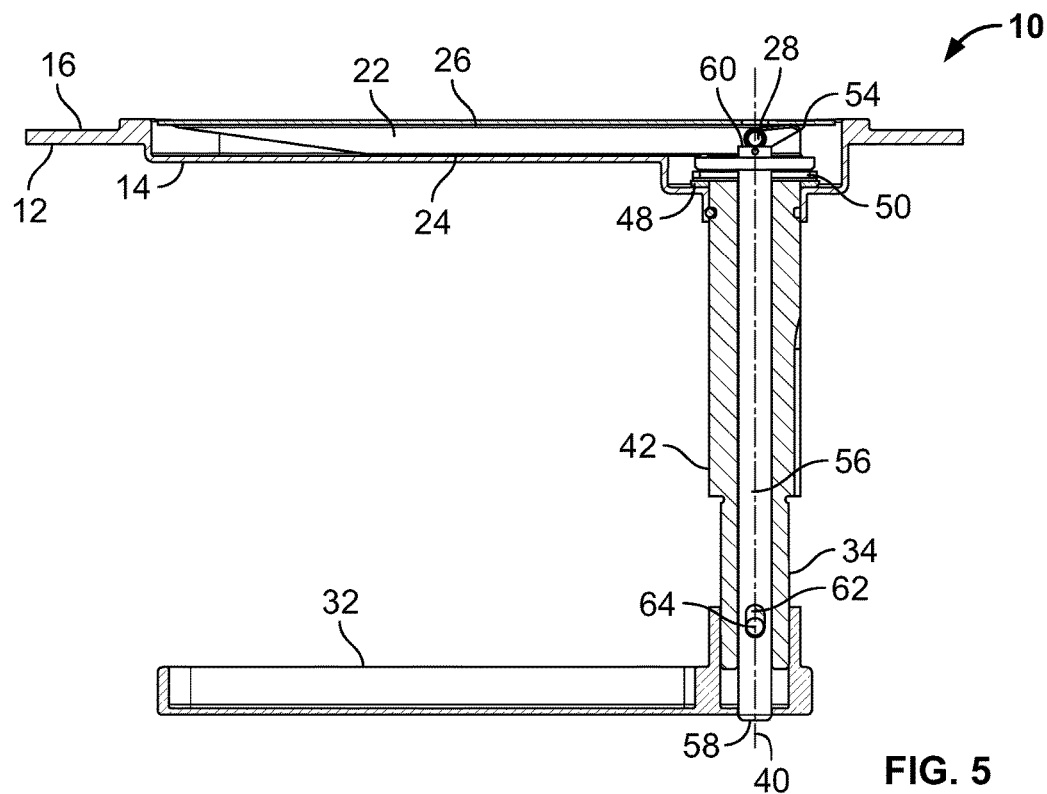
FIG. 5 is a side, cross-sectional view of the door handle shown in FIGS. 1 and 2, the door handle being shown with a button in a depressed position.
Figure 6:
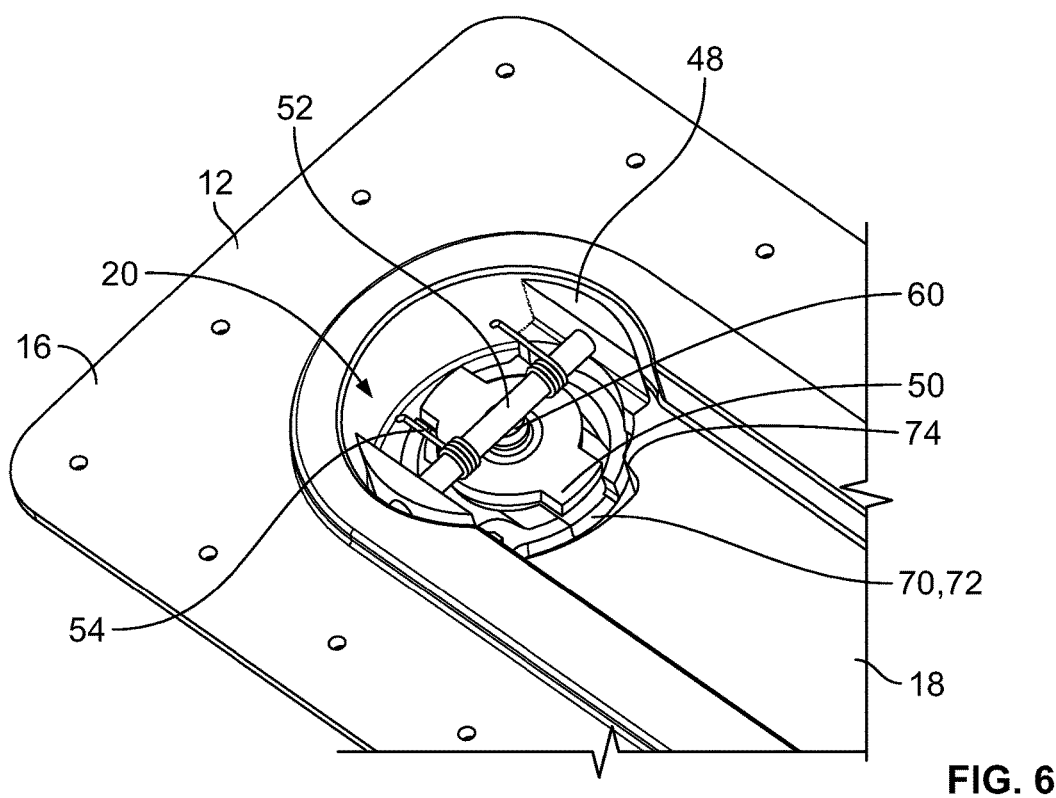
FIG. 6 is a top perspective view of the handle drive assembly of the door handle shown by FIG. 5, the outside handle having been removed in FIG. 5 to expose and illustrate the handle drive assembly.

Referring now to FIGS. 5 and 6, in an embodiment, the button 56 is adapted to float inside the gear drive 34 and is constrained to limited movement therein by the bolt 64. In an embodiment, the button 56 is under a biasing load applied by the torsion spring 54 (via the connection between the finger 50 and the exterior end 60 of the button 56) that biases the button toward the inside handle 32. The finger 50 is positioned within, but not fixed to, both the gear drive 34 and the handle drive 48. The interior end 58 of the button 56 is positioned through the top of the inside handle 32, which is secured to the gear drive 34 by the bolt 64, the nut 66, and the washer 68. When the button 56 is depressed with respect to the inside handle 32, the finger 50 moves accordingly and in relation to the gear drive 34 and the handle drive 48.

Figure 4:
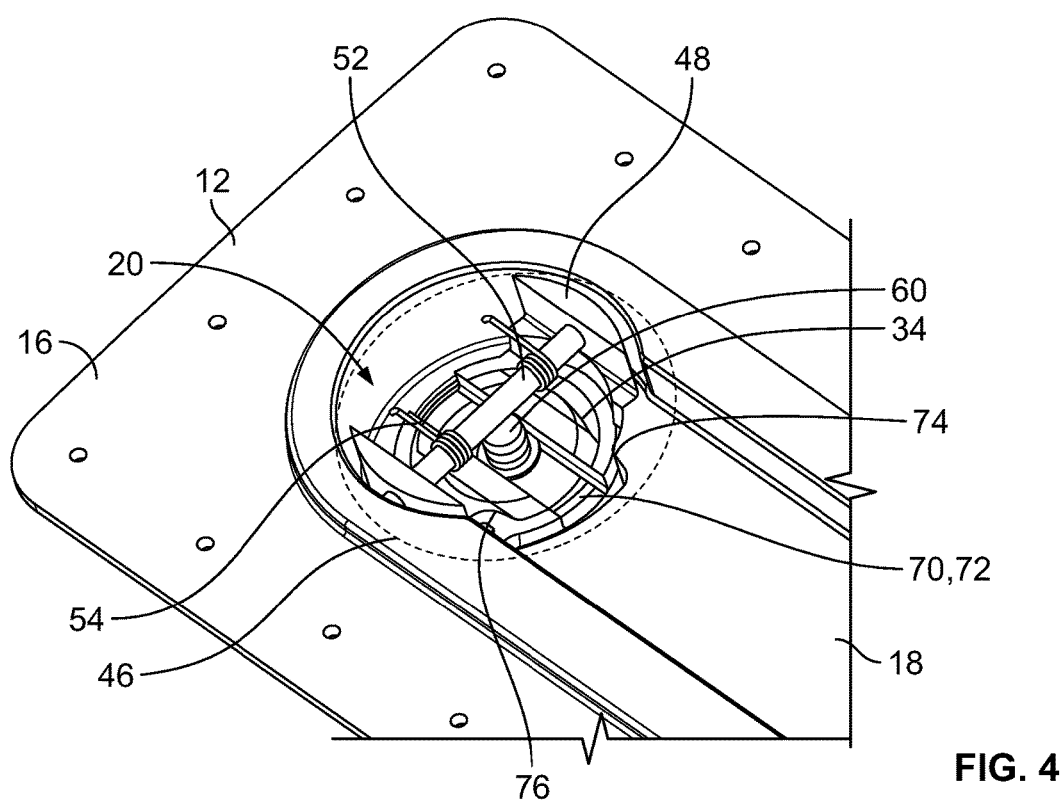
FIG. 4 is a top perspective view of a handle drive assembly employed by the door handle shown in FIG. 3, an outside handle employed by the door handle having been removed in FIG. 4 to expose and illustrate the handle drive assembly.
Figure 7:
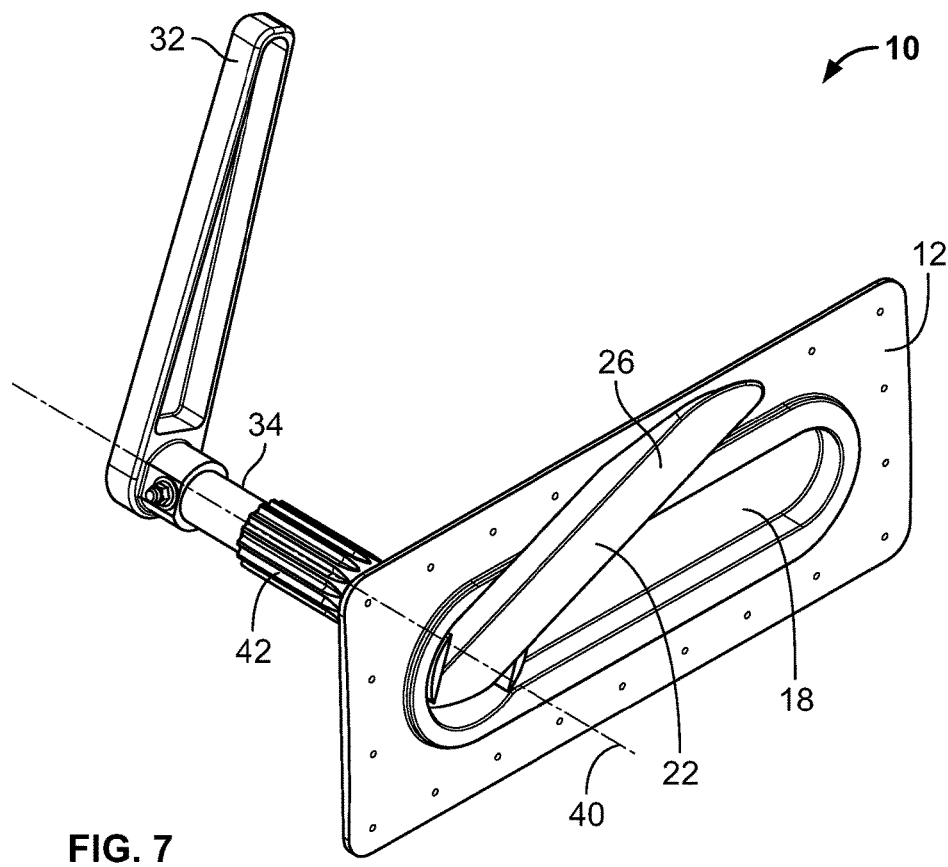
FIG. 7 is a front perspective view of the door handle shown in FIGS. 1 and 2, the door handle being shown in an open position from having been opened from an outside area.
Figure 8:
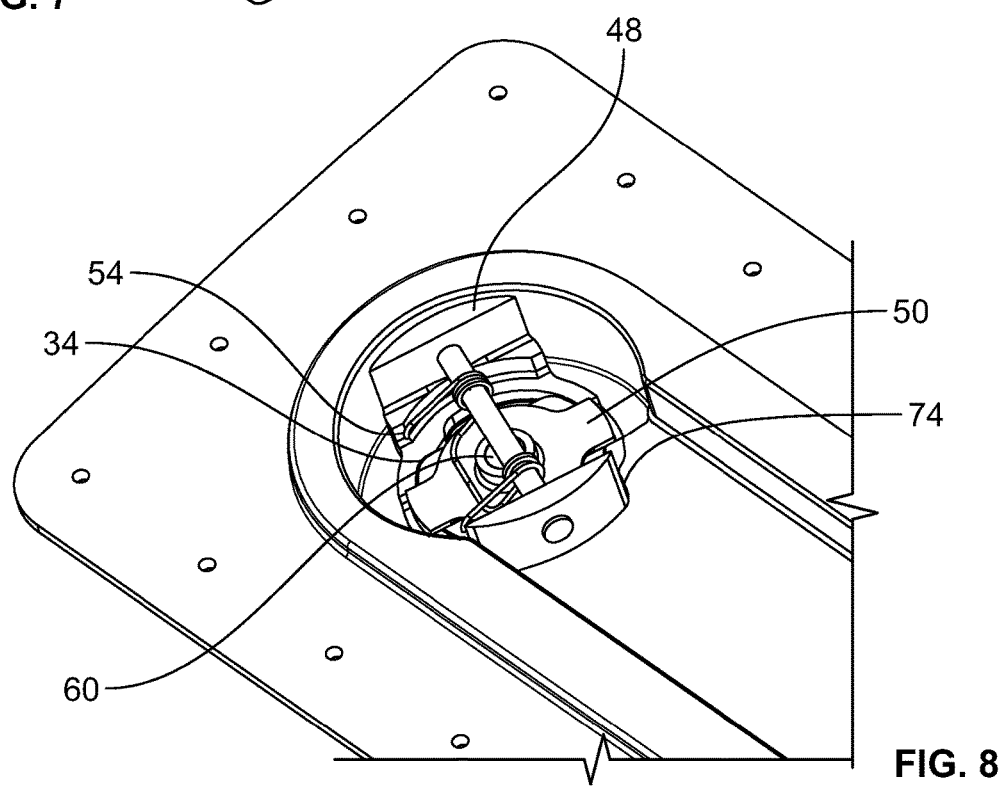
FIG. 8 is a top perspective view of the handle drive assembly of the door handle shown FIG. 7, the outside handle having been removed in FIG. 7 to expose and illustrate the handle drive assembly.

Referring now to FIGS. 7 and 8, to operate the door handle 10 from the outside and to open it from its closed position, the outside handle 22 is pushed and tilted out of the niche 18 of the housing 12 (e.g., by pushing inward on the end of the outside handle proximate the recess 20 of the housing 12) and is rotated counterclockwise about the longitudinal axis 40 to drive the gear drive 34 until the outside handle 22 stops (i.e., until a first portion of the handle drive 48 contacts the stop 74 of the housing 12 as shown in FIG. 8). In this regard, rotation of the outside handle 22 drives rotation of the handle drive 48 due to the positioning of the pin 52 within the pin hole 28 of the outside handle 22 and the attachment of the pin 52 to the handle drive 48, while rotation of the handle drive 48 drives rotation of the gear drive 34 due to the position of the finger 50 in the respective slots 70, 72 of the handle drive 48 and the gear drive 34, thereby driving the gear 42 of the gear drive 34. To close the door handle 10 from its open position, the outside handle 22 is rotated clockwise until stopped (i.e., until a second portion of the handle drive 48 contacts the stop 74 of the housing 12 as shown in FIG. 4), and the outside handle 22 is released. Once the outside handle 22 has been released, the biasing action of the torsion spring 54 returns the outside handle 22 to its resting position within the niche 18 of the housing 12.

Figure 9:
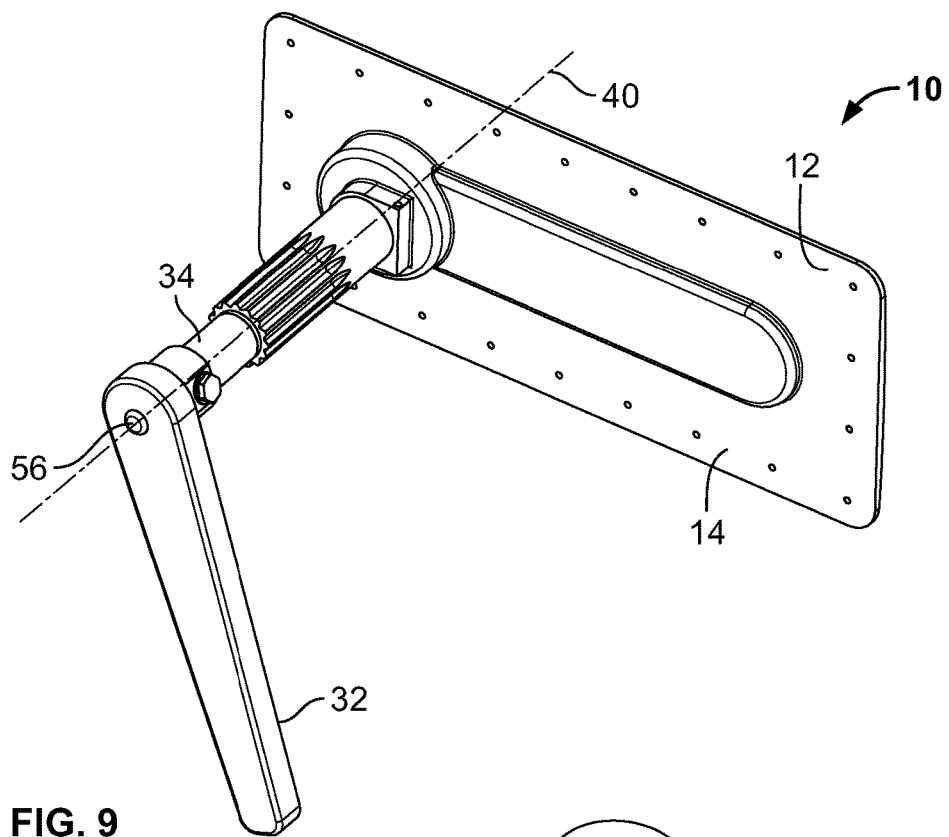
FIG. 9 is a rear perspective view of the door handle shown in FIGS. 1 and 2, the door handle being shown in an open position from having been opened from an inside area.
Figure 10:
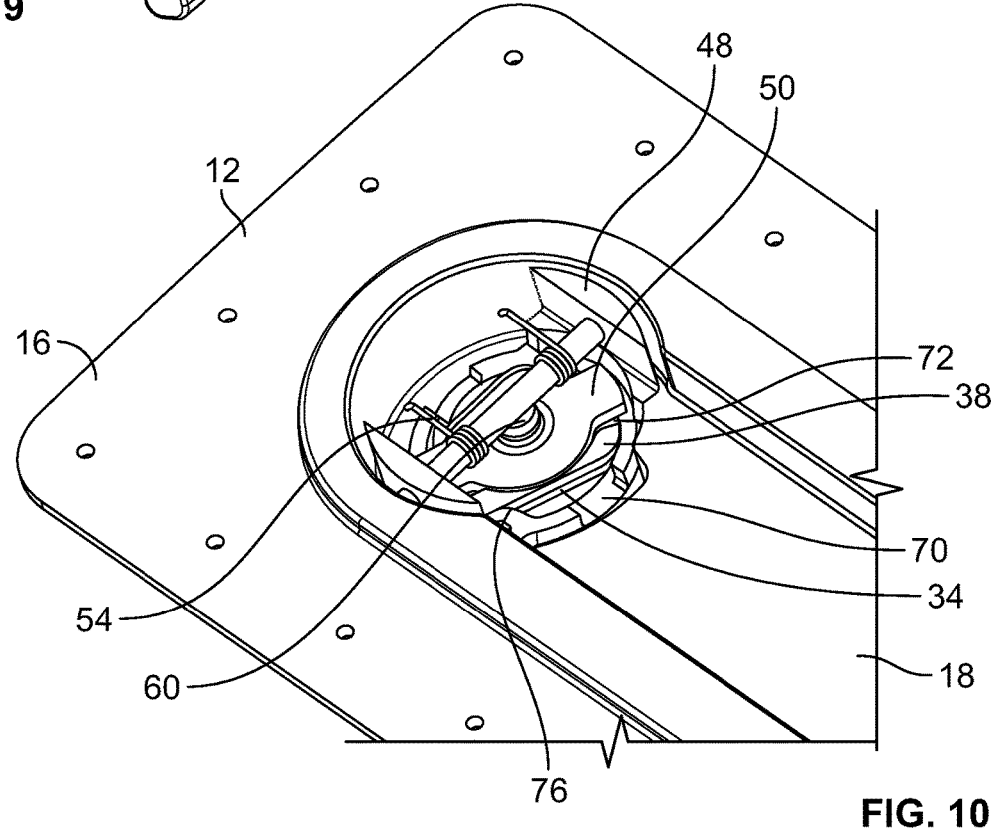
FIG. 10 is a top perspective view of the handle drive assembly of the door handle shown FIG. 9, the outside handle having been removed in FIG. 9 to expose and illustrate the handle drive assembly.
Figure 11:
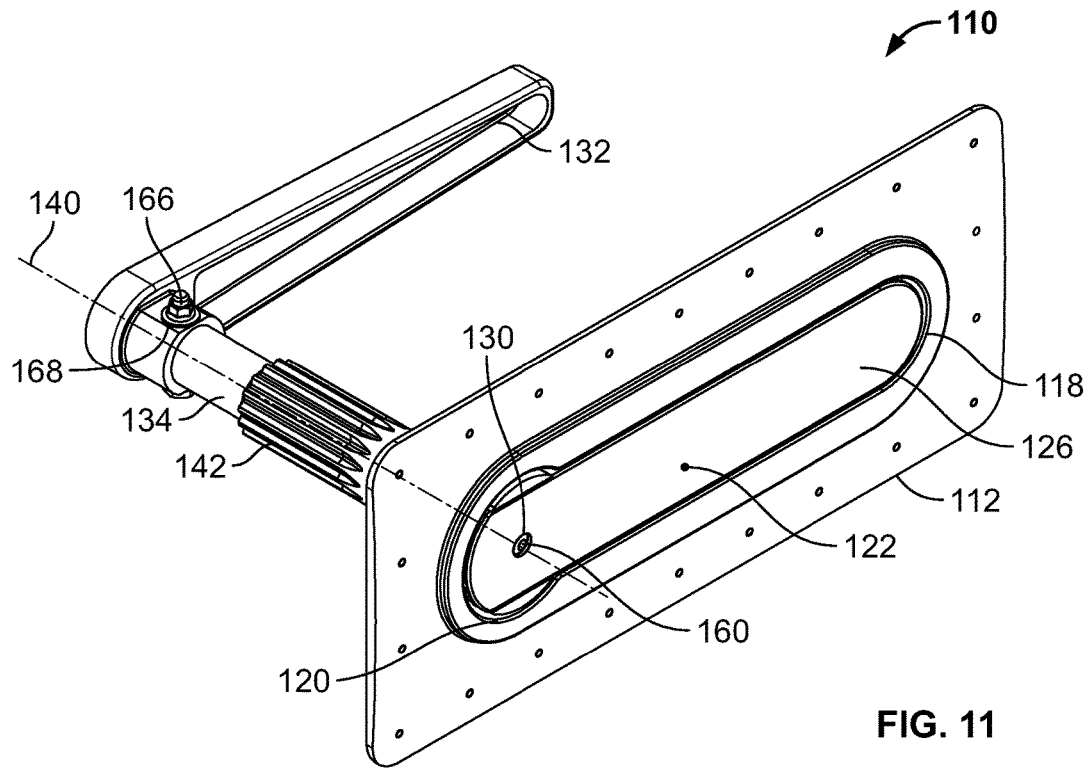
FIG. 11 is a front perspective view of a second embodiment of a door handle.
Figure 12:
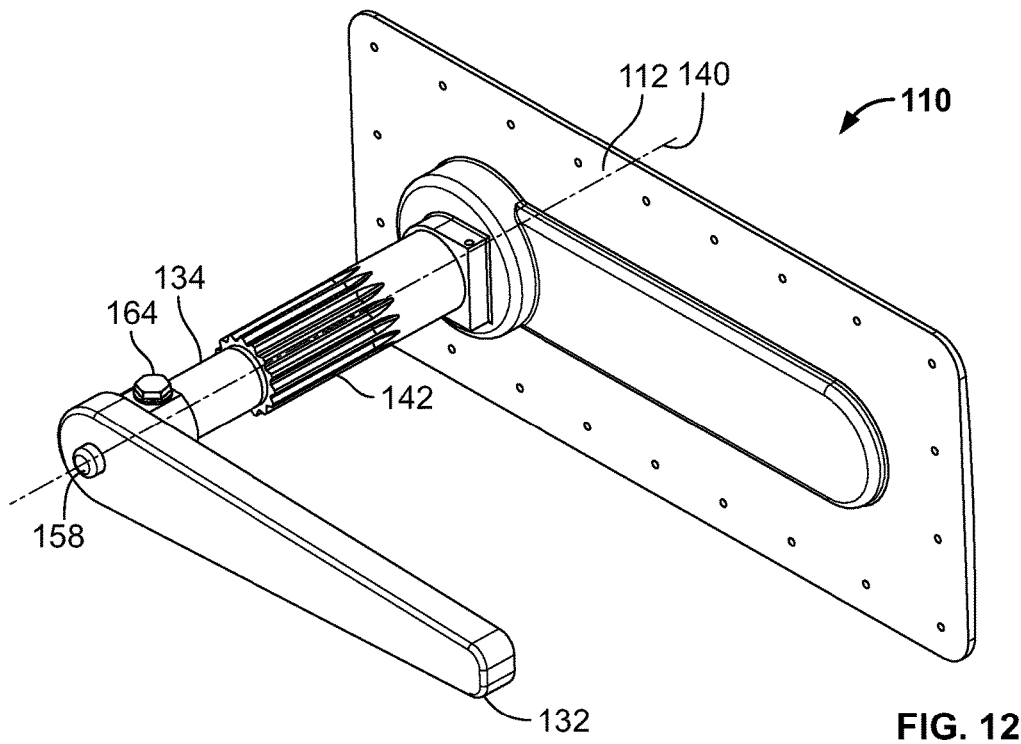
FIG. 12 is a rear perspective view of the door handle shown in FIG. 11.
Figure 13:
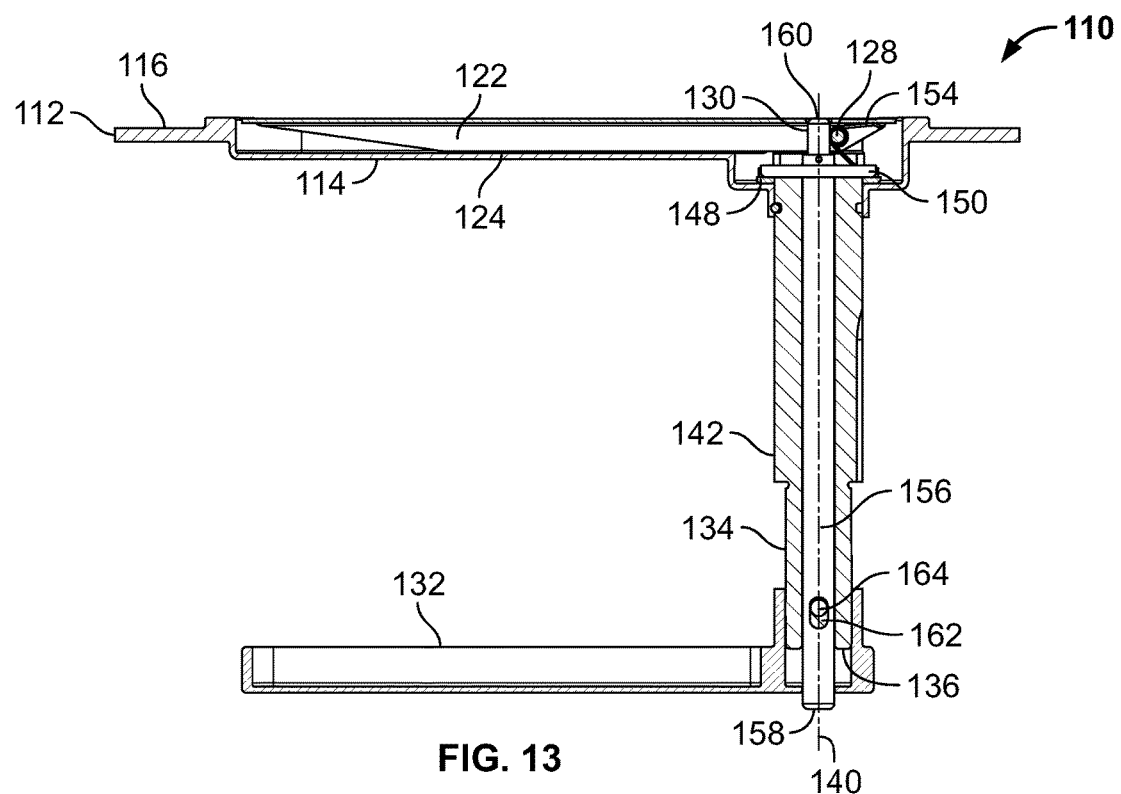
FIG. 13 is a side, cross-sectional view of the door handle shown in FIGS. 11 and 12, the door handle being shown in a closed position.

Referring now to FIGS. 9 and 10, to operate the door handle 10 from the inside and to open it from its closed position, the interior end 58 of the button 56 is depressed with respect to the inside handle 32 and the inside handle 32 is rotated clockwise to drive the gear drive 34 until it stops (i.e., until a first portion of the gear drive 34 contacts the stop 76 of the handle drive 48 as shown in FIG. 10), thereby driving the gear 42 of the gear drive 34. In this regard, when the button 56 is pushed as described above, the finger 50 moves accordingly and clears the slot 70 of the handle drive 48, thereby allowing the gear drive 34 to move independently of the handle drive 48. Thus, the gear drive 34 may be rotated while the outside handle 22 remains positioned within the niche 18 of the housing 12. To close the handle 10 from its open position, the inside handle 32 is rotated counterclockwise until it stops (i.e., until a second portion of the gear drive 34 contacts the stop 76 of the handle drive 48 as shown in FIG. 4). When the inside handle 32 is so positioned, the slots 70, 72 of the handle drive 48 and the gear drive 34, respectively, are aligned with one another, allowing the finger 50 to drop back into the slot 70 of the handle drive 48 when the inside handle 32 is in its closed position. The button 56 is then released and pops out automatically to its original position under the load of the torsion spring 54, in which position the finger 50 drops back into the slot 70 of the handle drive 48.

In an embodiment, the inside handle 32 can only be rotated and operated when the button 56 is pushed as described above. This is the case because, when the button 56 is in its resting position, the finger 50 is positioned within the slots 70, 72 of the handle drive 48 and the gear drive 34, respectively (as shown in FIG. 4). Accordingly, rotation of the inside handle 32, and, thereby, the gear drive 34, must be accompanied by corresponding rotation of the handle drive 48 due to the positioning of the finger 50, which fixes the gear drive 34 and the handle drive 48 in rotational alignment with respect to one another. Similarly, rotation of the handle drive 48 must be accompanied by corresponding rotation of the outside handle 22 because the pin 52 is fixed to the handle drive 48 and positioned within the pin hole 28 of the outside handle 22. However, the outside handle 22 is biased to a position within the niche 18 of the housing 12 by the torsion spring 54, and remains so positioned unless manipulated by a user (as described above with reference to FIGS. 7 and 8). When positioned within the niche 18 of the housing 12, the outside handle 22 is constrained from rotation. Because the outside handle 22 must rotate with the inside handle 32 when the button 56 is not pushed and the outside handle 22 is, by default, constrained from rotation, the inside handle 32 can only be rotated when the button 56 is pushed.

Referring now to FIGS. 11 through 14, a second embodiment of a door handle 110 is shown. Elements of the door handle 110 are analogous to the elements of the door handle 10 shown in FIGS. 1-10. However, the shapes, orientations, and functions of the elements may differ between the door handle 10 and the door handle 110. Therefore, elements of the door handle 110 are referenced by the numbers used in FIGS. 1-10 for analogous elements of the door handle 10, incremented by 100, but the names of some of the elements shown in FIGS. 11-14 may vary from those used with respect to the elements of FIGS. 1-10 to reflect their different shapes and orientations.

In an embodiment, the door handle 110 includes a substantially planar housing 112 having an interior surface 114 and an exterior surface 116 opposite the interior surface 114. An elongated niche 118 and a circular recess 120 are formed within the exterior surface 116 and are adjacent to one another such that the circular recess 120 is located at one end of the niche 118. An outside (i.e., exterior) handle 122 is housed within the niche 118 of the housing 112 (see FIG. 13). In an embodiment, the niche 118 is sized and shaped so that the outside handle 122 is housed within the niche 118 and is positioned below the exterior surface 116 of the housing 112. In other embodiments, the niche 118 is sized and shaped so that the outside handle 122 is housed within the niche 118 and is either flush or substantially flush with the exterior surface 116 of the housing 112. The outside handle 122 has an interior surface 124, an exterior surface 126 opposite the interior surface 124, a pin hole 128, and a button hole 130. The pin hole 128 has a transverse orientation such that it does not pierce the interior or exterior surfaces 124, 126 of the outside handle 122. The button hole 130 extends through the outside handle 122 from the interior surface 124 to the exterior surface 126. The pin hole 128 and the button hole 130 are positioned such that they do not intersect one another.

An inside (i.e., interior) handle 132 is located on an opposite side of the housing 112 from the outside handle 122. A generally cylindrical gear drive 134 connects the outside handle 122 and the inside handle 132 to one another. The gear drive 134 has an inside end 136 proximate the inside handle 132. The gear drive 134 also has an outside end 138 opposite the inside end 136 and proximate the outside handle 122. A longitudinal axis 140 extends between the inside end and outside ends 136, 138 of the gear drive 134. It will be apparent to those of skill in the art that the longitudinal axis 140 is not a physical feature of the gear drive 134, but, rather, is merely an imaginary point of reference for use in describing the gear drive 134 and the remaining elements of the door handle 110. The gear drive 134 is oriented such that the longitudinal axis 140 is substantially perpendicular to the housing 112. In an embodiment, the gear drive 134 includes a gear 142 formed in a peripheral surface thereof and adapted to drive a separate door mechanism (not shown in the Figures).

In an embodiment, the outside handle 122 is coupled to a handle drive assembly 146, which is positioned within the recess 120 of the housing 112. The handle drive assembly 146 includes a handle drive 148 attached to the outside end 138 of the gear drive 134, a finger 150 attached to the button 156, a pin 152 attached to the handle drive 148, and a torsion spring 154 positioned on the pin 152. The pin 152 is oriented perpendicularly to the longitudinal axis 140 of the gear drive 134. The pin 152 passes through the pin hole 128 of the exterior handle 122 and is fixed to the handle drive 148 at either end thereof, thereby coupling the handle drive assembly 146 to the exterior handle 122.

In an embodiment, the gear drive 134 contains a button 156 extending from an interior end 158 to an exterior end 160 opposite the interior end 158. The interior end 158 passes through the inside handle 132. The exterior end 160 passes through the finger 150 of the handle drive assembly 146 and through the button hole 130 of the outside handle 122. In an embodiment, the exterior end 160 of the button 156 may be referred to as a "flag" end. As will be discussed hereinafter, in an embodiment, the exterior end 160 of the button 156 is adapted to protrude through the button hole 130 and from the exterior surface 126 of the outside handle 122 in order to provide a visual indication or visual flag from the outside area that the inside handle 132 is not closed. In an embodiment, the exterior end 160 of the button 156 may be colored distinctly so as to enhance visibility. A slot 162 passes through the button 156 proximate the interior end 158. In an embodiment, a bolt 164 passes through the inside handle 132 and through the slot 162 of the button 156. In an embodiment, the bolt 164 is secured by a nut 166 and a washer 168, thereby retaining the button 156 and constraining the motion thereof to the travel of the bolt 164 within the slot 162 of the button 156. In an embodiment, the handle drive 148 includes a slot 170 while the outside end 138 of the gear drive 134 includes a slot 172.

In an embodiment, the outside handle 122 is adapted to pivot at one end of the handle drive 148 (i.e., the outside handle 122 pivots about the pin 152), and is spring loaded by the torsion spring 154 so as to be urged toward a position within the niche 118 of the housing 112. In an embodiment, the handle drive 148 is adapted (i.e., sized, shaped, and positioned) in such a manner so as to pivot and float between the housing 112 and the gear drive 134, which is secured within the housing 112. In an embodiment, the housing 112 includes at least one stop 174 positioned so as to limit the rotation of the handle drive 148. In an embodiment, the handle drive 148 includes at least one stop 176 positioned so as to limit the rotation of the gear drive 134.

Figure 15:
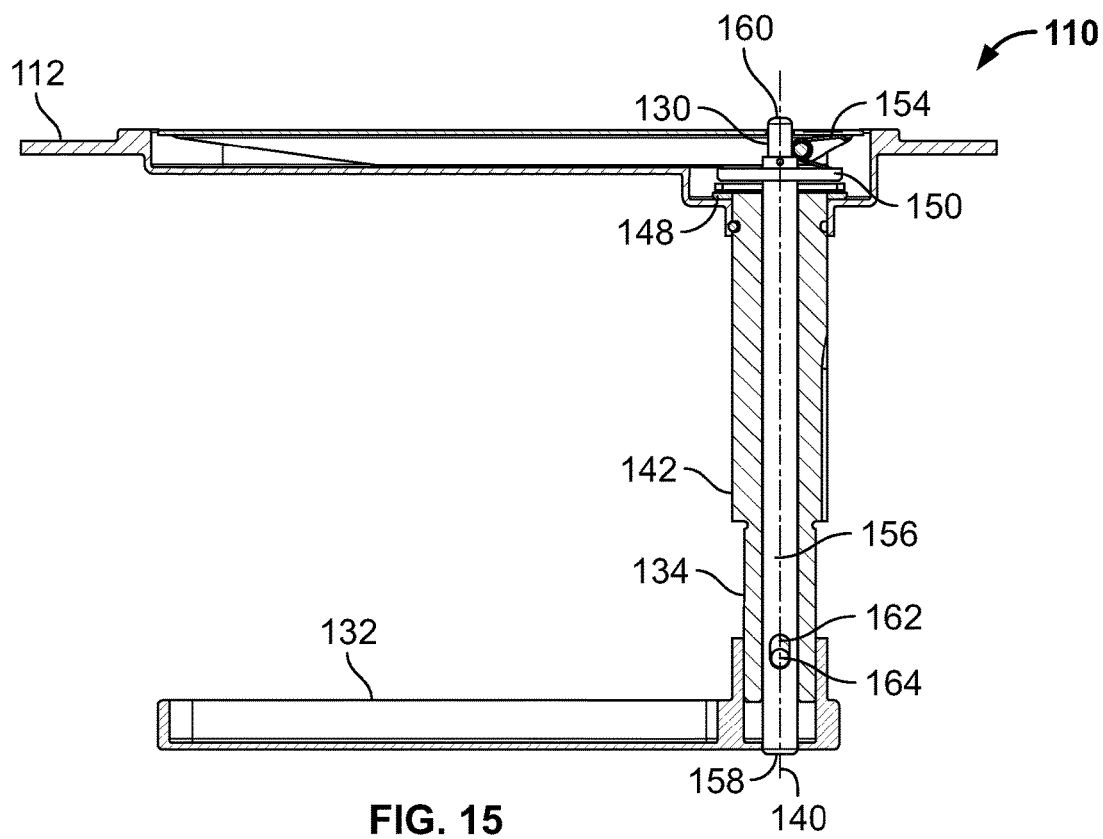
FIG. 15 is a side, cross-sectional view of the door handle shown in FIGS. 11 and 12, the door handle being shown with a button in a depressed position and with one end of the button being shown in a protruded position.
Figure 16:
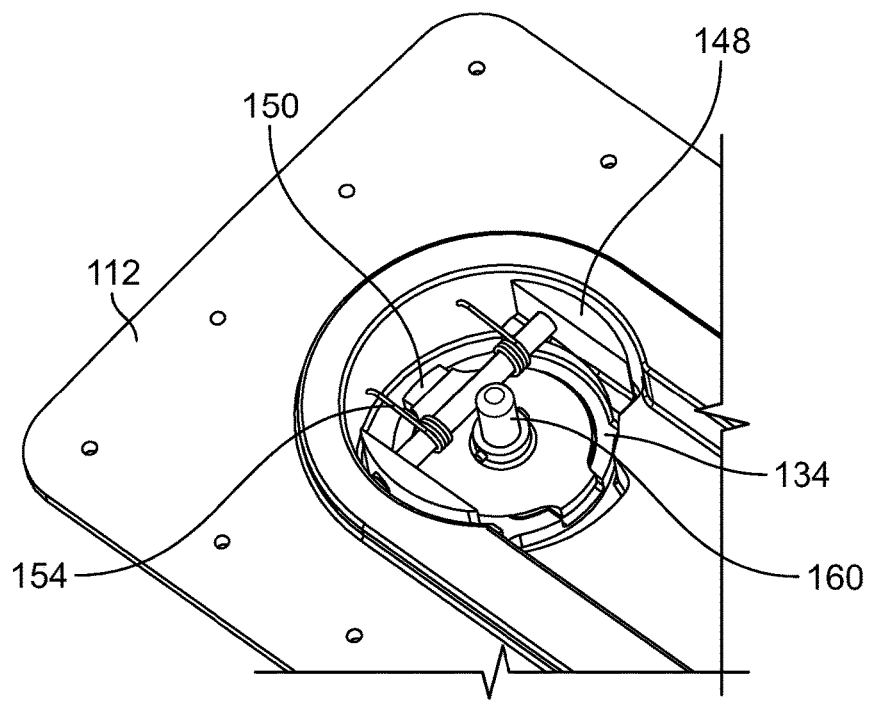
FIG. 16 is a top perspective view of the handle drive assembly of the door handle shown in FIG. 15, the outside handle having been removed in FIG. 15 to expose and illustrate the handle drive assembly.

Referring now to FIGS. 15 and 16, in an embodiment, the button 156 is adapted to float inside the gear drive 134 and is constrained to limited movement therein by the bolt 164. In an embodiment, the button 156 is under a biasing load applied by the torsion spring 154 (via the connection between the finger 150 and the exterior end 160 of the button 156) that biases the button toward the inside handle 132. The finger 150 is positioned within, but not fixed to, both the gear drive 134 and the handle drive 148. As indicated above, the exterior end 160 of the button 156 extends through the button hole 130 of the outside handle 122, while the interior end 158 of the button 156 is positioned through the top of the inside handle 132, which is secured to the gear drive 134 by the bolt 164, the nut 166, and the washer 168. When the button 156 is depressed with respect to the inside handle 132, the finger 150 moves accordingly and in relation to the gear drive 134 and the handle drive 148.

Figure 14:
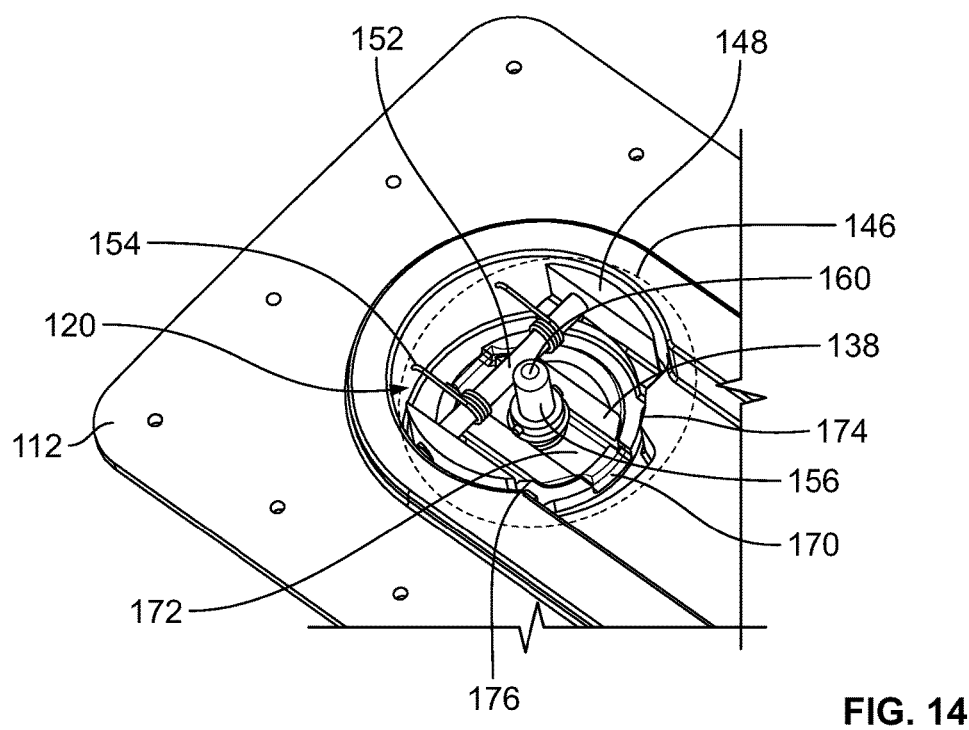
FIG. 14 is a top perspective view of a handle drive assembly employed by the door handle shown in FIG. 13, an outside handle employed by the door handle having been removed in FIG. 14 to expose and illustrate the handle drive assembly, and a finger employed by the door handle assembly being shown transparently.
Figure 17:
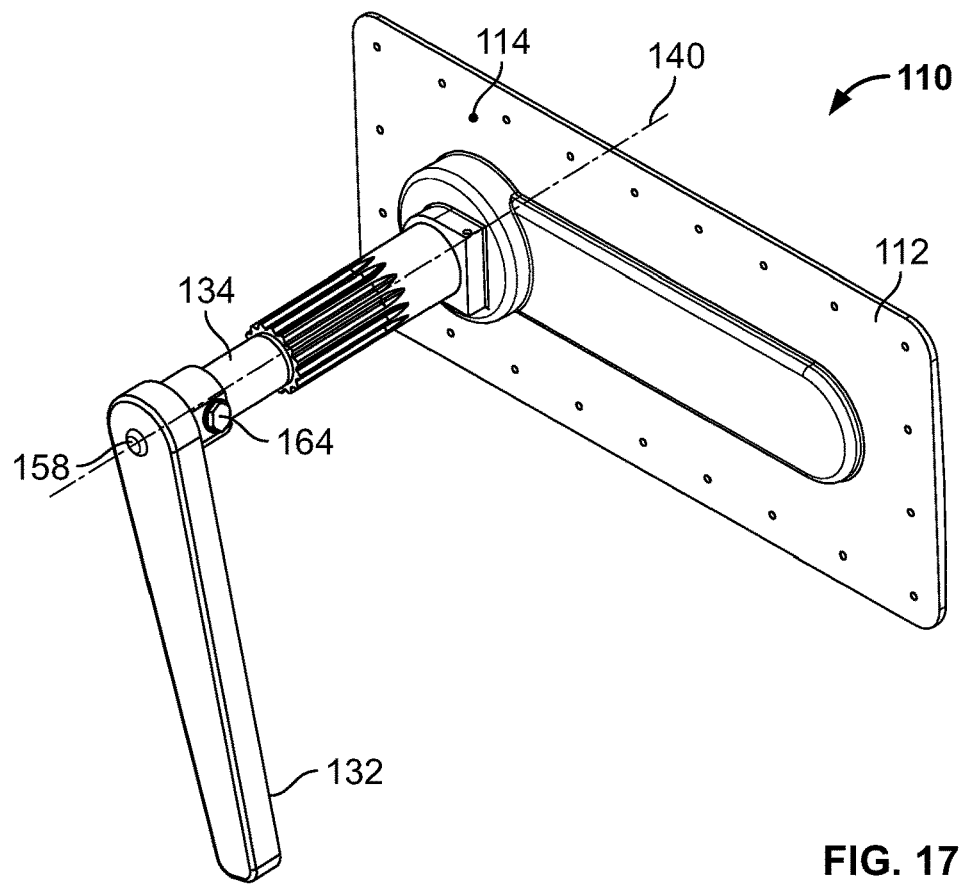
FIG. 17 is a rear perspective view of the door handle shown in FIGS. 11 and 12, the door handle being shown in an open position from having been opened from an inside area.
Figure 18:
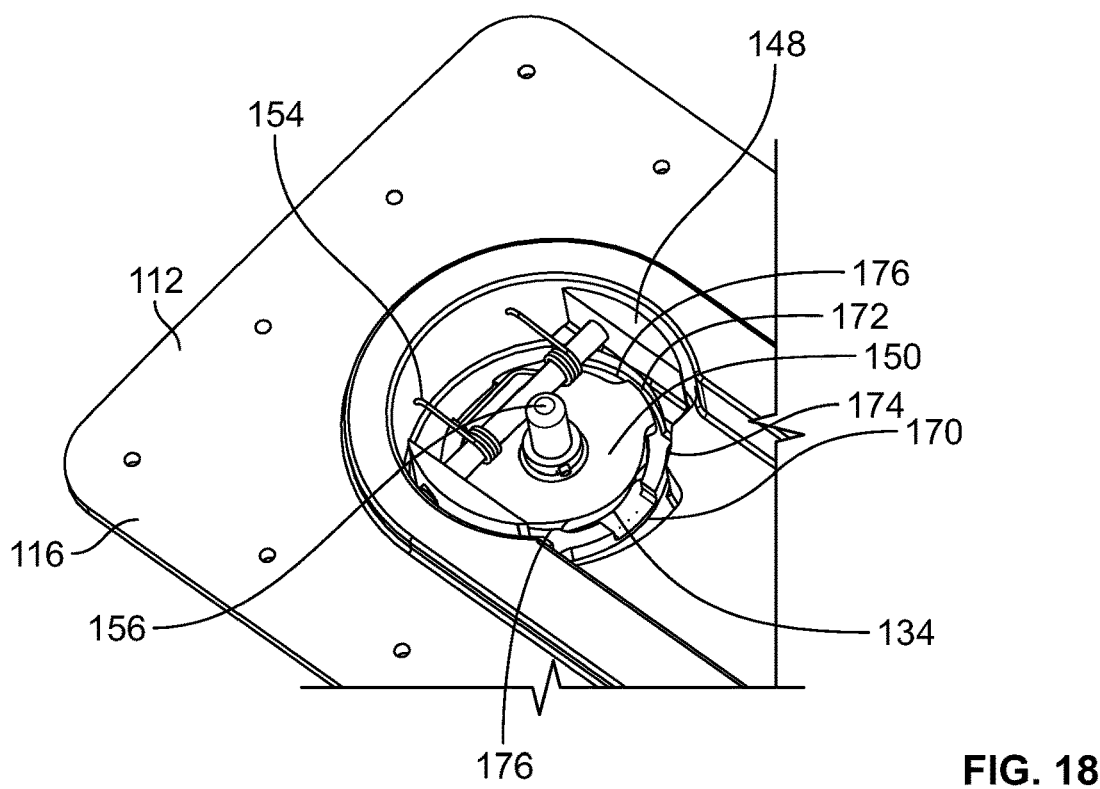
FIG. 18 is a top perspective view of the handle drive assembly of the door handle shown FIG. 17, the outside handle having been removed in FIG. 18 to expose and illustrate the handle drive assembly.
Figure 19:
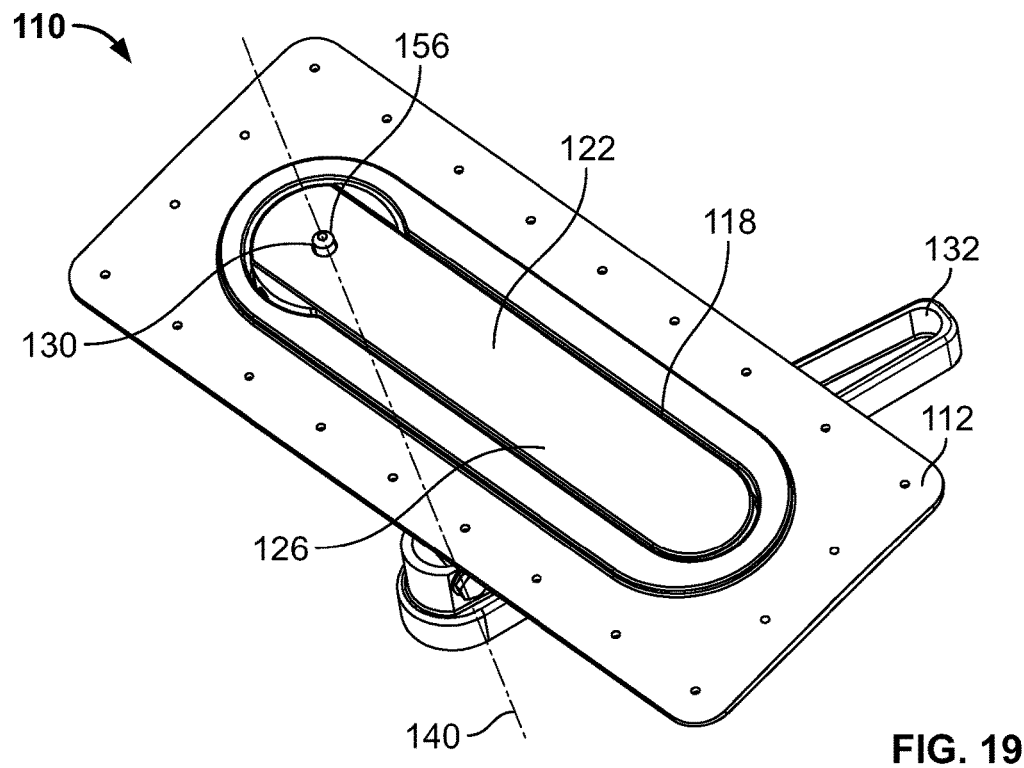
FIG. 19 is a rear perspective view of the door handle shown in FIG. 17.

Referring now to FIGS. 17 through 19, to operate the door handle 110 from the inside and to open it from its closed position, the interior end 158 of the button 156 is depressed with respect to the inside handle 132 is pushed and the inside handle 132 is rotated clockwise to drive the gear drive 134 until it stops (i.e., until a first portion of the gear drive 134 contacts the stop 176 of the handle drive 148 as shown in FIG. 18), thereby driving the gear 142 of the gear drive 134. In this regard, when the button 156 is pushed as described above, the exterior end 160 protrudes outwardly from the button hole 130 and the exterior surface 126 of the outside handle 122 in order to provide a visual indication or visual flag from an exterior area (i.e., a flag) that the inside handle 132 is in an open position. Also when the button 156 is pushed as described above, the finger 150 moves accordingly and clears the slot 170 of the handle drive 148, thereby allowing the gear drive 134 to move independently of the handle drive 148. Thus, the gear drive 134 may be rotated while the outside handle 122 remains positioned within the niche 118 of the housing 112. To close the handle 110 from its open position, the inside handle 132 is rotated counterclockwise until it stops (i.e., until a second portion of the gear drive 134 contacts the stop 176 of the handle drive 148 as shown in FIG. 14). When the inside handle 132 is so positioned, the slots 170, 172 of the handle drive 148 and the gear drive 134, respectively, are aligned with one another, allowing the finger 150 to drop back into the slot 170 of the handle drive 148 when the inside handle 132 is in its closed position. The button 156 is then released and pops out automatically to its original position under the load of the torsion spring 154, in which position the finger 150 drops back into the slot 170 of the handle drive 148 and the exterior end 160 of the button 156 is positioned flush with the exterior surface 126 of the outside handle 122.

Figure 20:
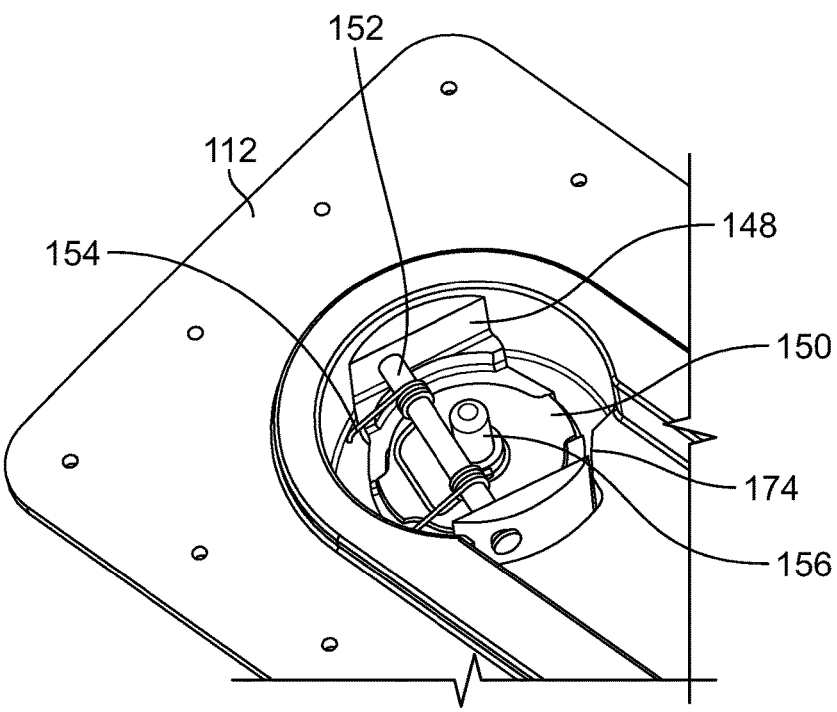
FIG. 20 is a top perspective view of the handle drive assembly of the door handle shown FIGS. 11 and 12, the door handle being shown in an open position having been opened from an outside area, the outside handle having been removed in FIG. 20 to expose and illustrate the handle drive assembly.
Figure 21:
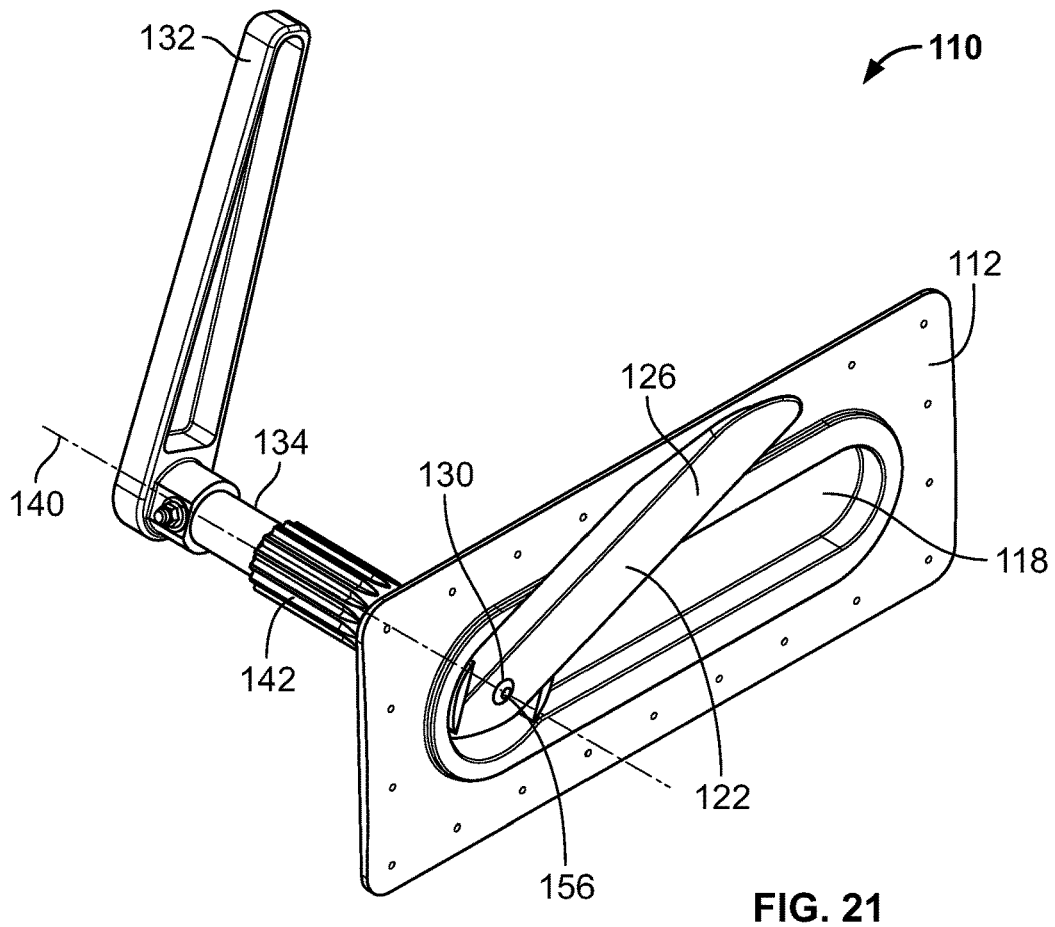
FIG. 21 is a front perspective view of the door handle shown in FIG. 20, the door handle being shown in an open position from having been opened from an outside area.
Figure 22:
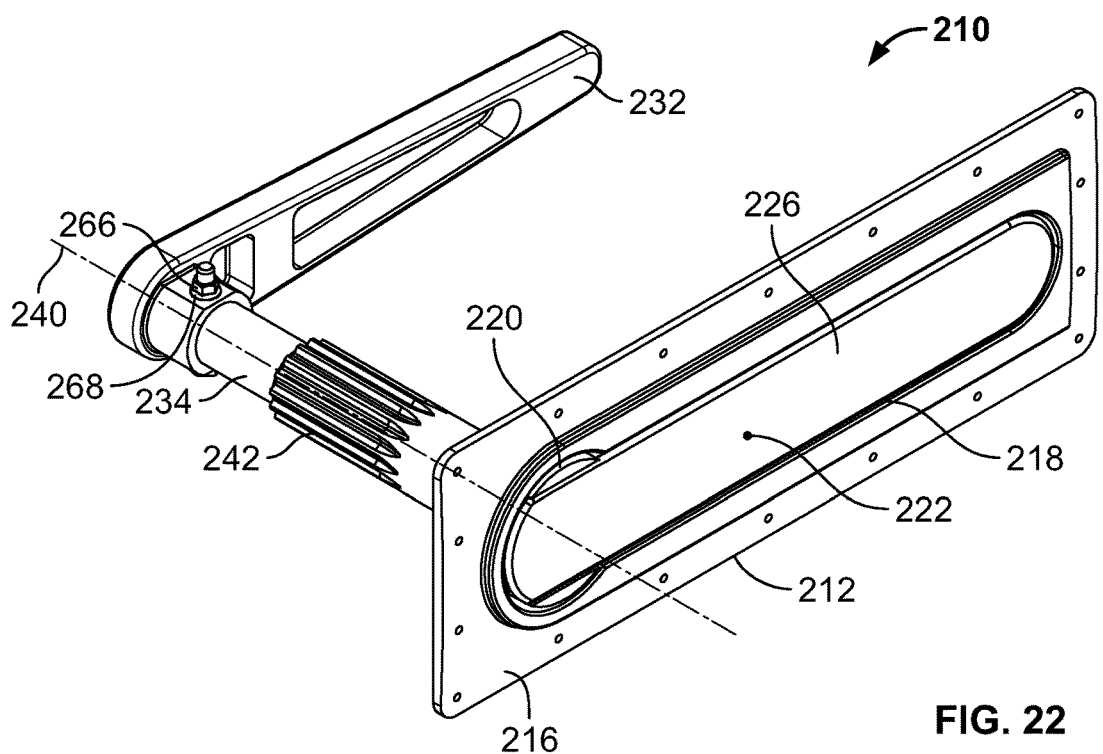
FIG. 22 is a front perspective view of a third embodiment of a door handle.
Figure 23:
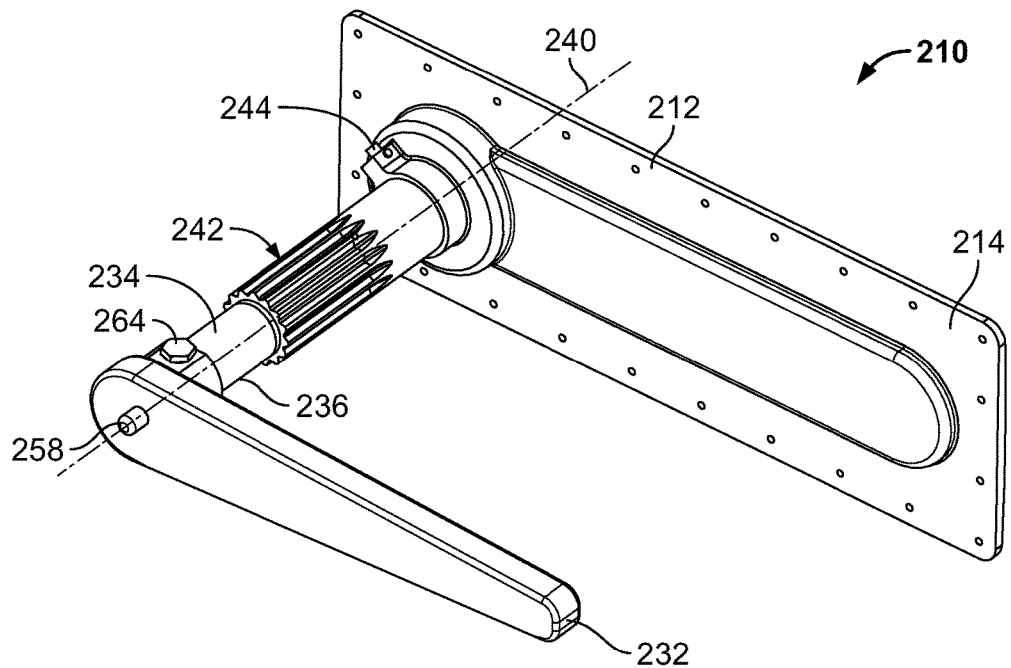
FIG. 23 is a rear perspective view of the door handle shown in FIG. 22.

Referring now to FIGS. 20 and 21, to operate the door handle 110 from the outside and to open it from its closed position, the outside handle 122 is pushed and tilted out of the niche 118 of the housing 112 (e.g., by pushing inward on the end of the outside handle proximate the recess 120 of the housing 112) and is rotated counterclockwise about the longitudinal axis 140 to drive the gear drive 134 until the outside handle 122 stops (i.e., until a first portion of the handle drive 148 contacts the stop 174 of the housing 112 as shown in FIG. 20). In this regard, rotation of the outside handle 122 drives rotation of the handle drive 148 due to the positioning of the pin 152 within the pin hole 128 of the outside handle 122 and the attachment of the pin 152 to the handle drive 148, while rotation of the handle drive 148 drives rotation of the gear drive 134 due to the position of the finger 150 in the respective slots 170, 172 of the handle drive 148 and the gear drive 134, thereby driving the gear 142 of the gear drive 134. To close the door handle 110 from its open position, the outside handle 122 is rotated clockwise until stopped (i.e., until a second portion of the handle drive 148 contacts the stop 174 of the housing 112 as shown in FIG. 14), and the outside handle 122 is released. Once the outside handle 122 has been released, the biasing action of the torsion spring 154 returns the outside handle 122 to its resting position within the niche 118 of the housing 112.

In an embodiment, the inside handle 132 can only be rotated and operated when the button 156 is pushed as described above. This is the case because, when the button 156 is in its resting position, the finger 150 is positioned within the slots 170, 172 of the handle drive 148 and the gear drive 134, respectively (as shown in FIG. 14). Accordingly, rotation of the inside handle 132, and, thereby, the gear drive 134, must be accompanied by corresponding rotation of the handle drive 148 due to the positioning of the finger 150, which fixes the gear drive 134 and the handle drive 148 in rotational alignment with respect to one another. Similarly, rotation of the handle drive 148 must be accompanied by corresponding rotation of the outside handle 122 because the pin 152 is fixed to the handle drive 148 and positioned within the pin hole 128 of the outside handle 122. However, the outside handle 122 is biased to a position within the niche 118 of the housing 112 by the torsion spring 154, and remains so positioned unless manipulated by a user (such manipulation being described above with reference to FIGS. 20 and 21); when positioned within the niche 118 of the housing 112, the outside handle 122 is constrained from rotation. Therefore, because the outside handle 122 must rotate with the inside handle 132 when the button 156 is not pushed and the outside handle 122 is, by default, constrained from rotation, the inside handle 132 can only be rotated when the button 156 is pushed.

Referring now to FIGS. 22 through 27, a third embodiment of a door handle 210 is shown. Elements of the door handle 210 are analogous to the elements of the door handle 10 shown in FIGS. 1-10. However, the shapes, orientations, and functions of the elements may differ between the door handle 10 and the door handle 210. Therefore, elements of the door handle 110 are referenced by the numbers used in FIGS. 1-10 for analogous elements of the door handle 10, incremented by 210, but the names of some of the elements shown in FIGS. 22-27 may vary from those used with respect to the elements of FIGS. 1-10 to reflect their different shapes and orientations.

In an embodiment, the door handle 210 includes a substantially planar housing 212 having an interior surface 214 and an exterior surface 216 opposite the interior surface 214. An elongated niche 218 and a circular recess 220 are formed within the exterior surface 216 and are adjacent to one another such that the circular recess 220 is located at one end of the niche 218. An outside (i.e., exterior) handle 222 is housed within the niche 218 of the housing 212 (see FIG. 22). In an embodiment, the niche 218 is sized and shaped so that the outside handle 222 is housed within the niche 218 and is positioned below the exterior surface 216 of the housing 212. In other embodiments, the niche 218 is sized and shaped so that the outside handle 222 is housed within the niche 218 and is either flush or substantially flush with the exterior surface 216 of the housing 212. The outside handle 222 has an interior surface 224, an exterior surface 226 opposite the interior surface 224, and a pin hole 228. The pin hole 228 has a transverse orientation such that it does not pierce the interior or exterior surfaces 224, 226 of the outside handle 222.

An inside (i.e., interior) handle 232 is located on an opposite side of the housing 212 from the outside handle 222. A generally cylindrical gear drive 234 connects the outside handle 222 and the inside handle 232 to one another. The gear drive 234 has an inside end 236 proximate the inside handle 232. The gear drive 234 also has an outside end 238 opposite the inside end 236 and proximate the outside handle 222. A longitudinal axis 240 extends between the inside end and outside ends 236, 238 of the gear drive 234. It will be apparent to those of skill in the art that the longitudinal axis 240 is not a physical feature of the gear drive 234, but, rather, is merely an imaginary point of reference for use in describing the gear drive 234 and the remaining elements of the door handle 210. The gear drive 234 is oriented such that the longitudinal axis 240 is substantially perpendicular to the housing 212.

In an embodiment, the gear drive 234 includes a gear 242 formed in a peripheral surface thereof and adapted to drive a separate door mechanism (not shown in the Figures). In an embodiment, one end of the gear drive 234 is secured in the housing 212 by a stop pin 244. In an embodiment, a stop pin slot 278 is formed in the gear drive 234 proximate the outside end 238 and positioned such that, when the gear drive 234 is secured in the housing 212, the stop pin is positioned within the stop pin slot 278. In an embodiment, the stop pin 244 and the stop pin slot 278 cooperate to limit the rotation of the gear drive 234 about its longitudinal axis 240 to that permitted by the travel of the stop pin 244 within the stop pin slot 278.

In an embodiment, the gear drive 234 is connected to the outside handle 222 by a handle drive assembly 246, which is positioned within the recess 220 of the housing 212. In an embodiment, exterior end 238 of the gear drive 234 is positioned within the recess 220 of the housing 212. The outside handle 222 is coupled to the exterior end 238 of the gear drive 234 such that rotation of the gear drive 234 about the longitudinal axis 240 causes corresponding rotation of the outside handle 222 about the longitudinal axis and vice versa. In an embodiment, the outside handle 222 is coupled to the exterior end 238 of the gear drive 234 by a pin 252, which passes through the pin hole 228 of the outside handle 222 and is fixed to the exterior end 238 of the gear drive 234 at either end thereof. A torsion spring 254 is positioned on the pin 252. The handle drive assembly 246 includes the exterior end 238 of the gear drive 234, the pin 252, the torsion spring 254, and the outside handle 222.

In an embodiment, the gear drive 234 contains a button 256 extending from an interior end 258 to an exterior end 260 opposite the interior end 258. The interior end 258 passes through the inside handle 232. The exterior end 260 is adjacent the outside handle 222. A slot 262 is formed in the button 256 proximate the interior end 258. In an embodiment, a bolt 264 passes through the inside handle 232 and through the slot 262 of the button 256. In an embodiment, the bolt 264 is secured by a nut 266 and a washer 268, thereby retaining the button 256 and constraining the motion thereof to the travel of the bolt 264 within the slot 262 of the button 256. In an embodiment, the outside handle 222 is adapted to pivot about the pin 252, and is spring loaded by the torsion spring 254 so as to be urged toward a position within the niche 218 of the housing 212.

Figure 24:
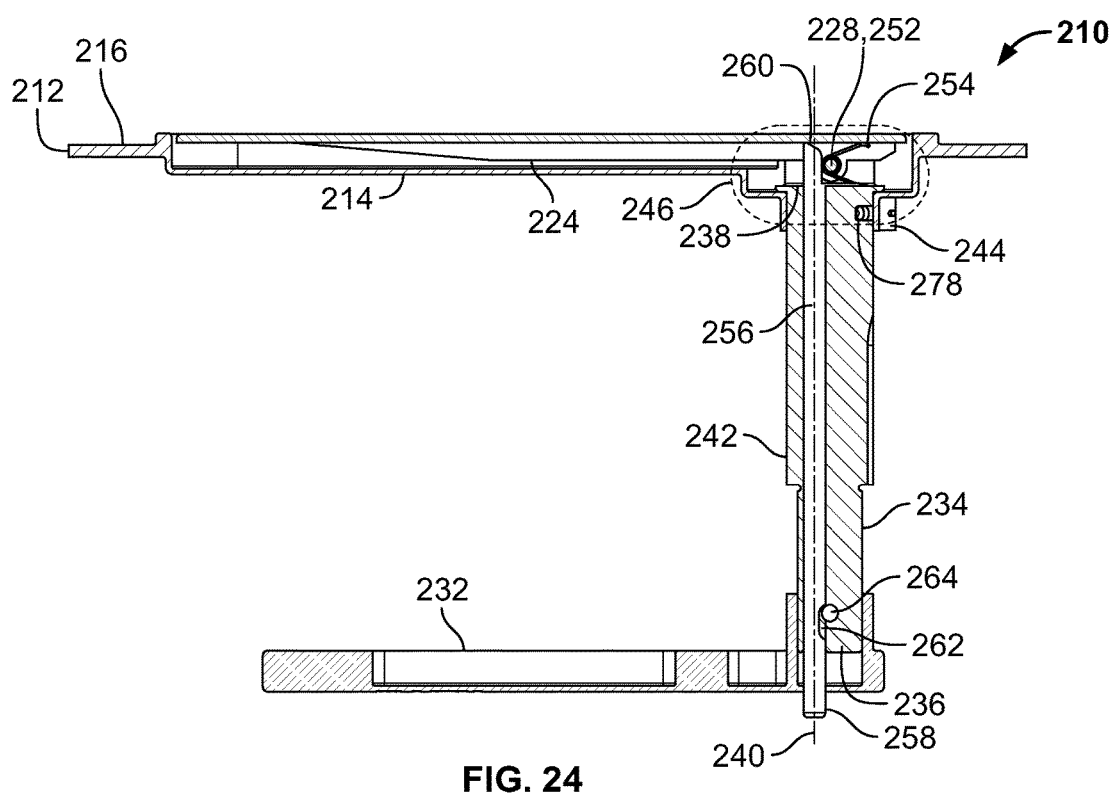
FIG. 24 is a side, cross-sectional view of the door handle shown in FIGS. 22 and 23, the door handle being shown in a closed position.

Referring now to FIG. 24, in an embodiment, the button 256 is adapted to float inside the gear drive 234 and is constrained to limited movement therein by the bolt 264. In an embodiment, the button 256 is under a biasing load applied by the torsion spring 254 (via the connection between the torsion spring 254 and the outside handle 222, which abuts the button 256) that biases the button toward the inside handle 232. The finger 250 is positioned within, but not fixed to, the gear drive 234. The interior end 258 of the button 256 is positioned through the top of the inside handle 232, which is secured to the gear drive 234 by the bolt 264, the nut 266, and the washer 268. When the button 256 is depressed with respect to the inside handle 232, the finger 250 moves accordingly and in relation to the gear drive 234.

While the process to operate the door handle 210 from the inside and to open it from its closed position is not shown in the Figures, FIGS. 9 and 10 illustrate analogous elements of the door handle 10 to the elements of the door handle 210, the latter of which is described in this paragraph hereinafter. To operate the door handle 210 from the inside and to open it from its closed position, the interior end 258 of the button 256 is depressed with respect to the inside handle 232. Depression of the button 256 forces the exterior end 260 of the button 256 against the outside handle 222, which, in turn, forces the outside handle 222 out of the niche 218 of the housing 212. The inside handle 232 is rotated clockwise to drive the gear drive 234 until it stops (i.e., until a first portion of the stop pin slot 278 contacts the stop pin 244), thereby driving the gear 242 of the gear drive 234. To close the handle 210 from its open position, the inside handle 232 is rotated counterclockwise until it stops (i.e., until a second portion of stop pin slot 278 contacts the stop pin 244). When the inside handle 232 is so positioned, the outside handle 222 is aligned with the niche 218 of the housing 212, allowing the outside handle 222 to drop back into the niche 218 when the button 256 is released. The button 256 is then released and pops out automatically to its original position under the load of the torsion spring 254, in which position the outside handle 222 drops back into the niche 218 of the housing 212.

Figure 25:
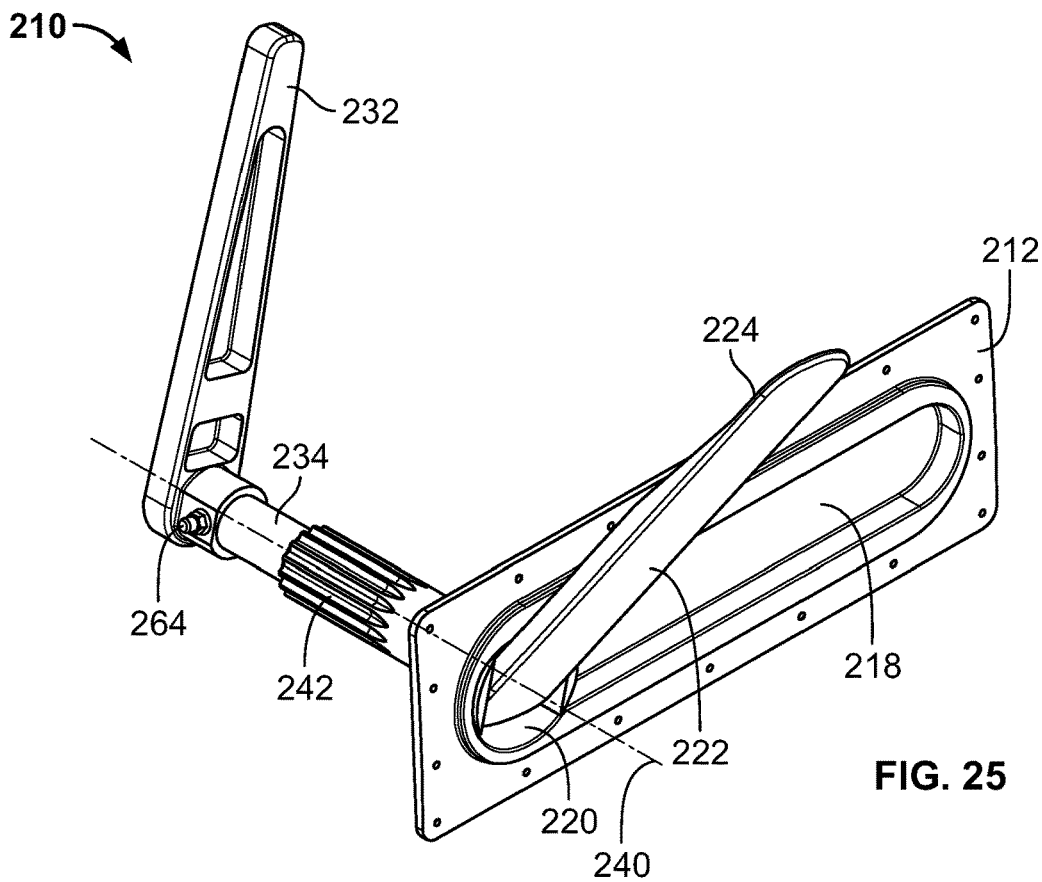
FIG. 25 is a front perspective view of the door handle shown in FIGS. 22 and 23, the door handle being shown in an open position from having been opened from an outside area.
Figure 26:
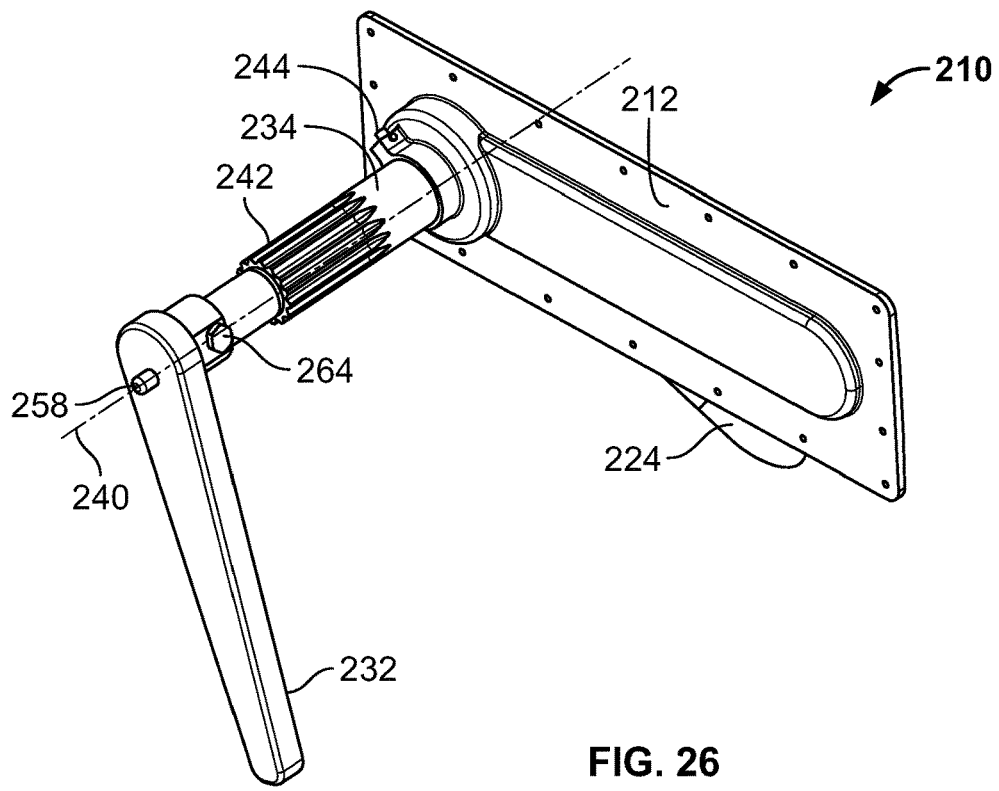
FIG. 26 is a rear perspective view of the door handle shown in FIG. 25.
Figure 27:
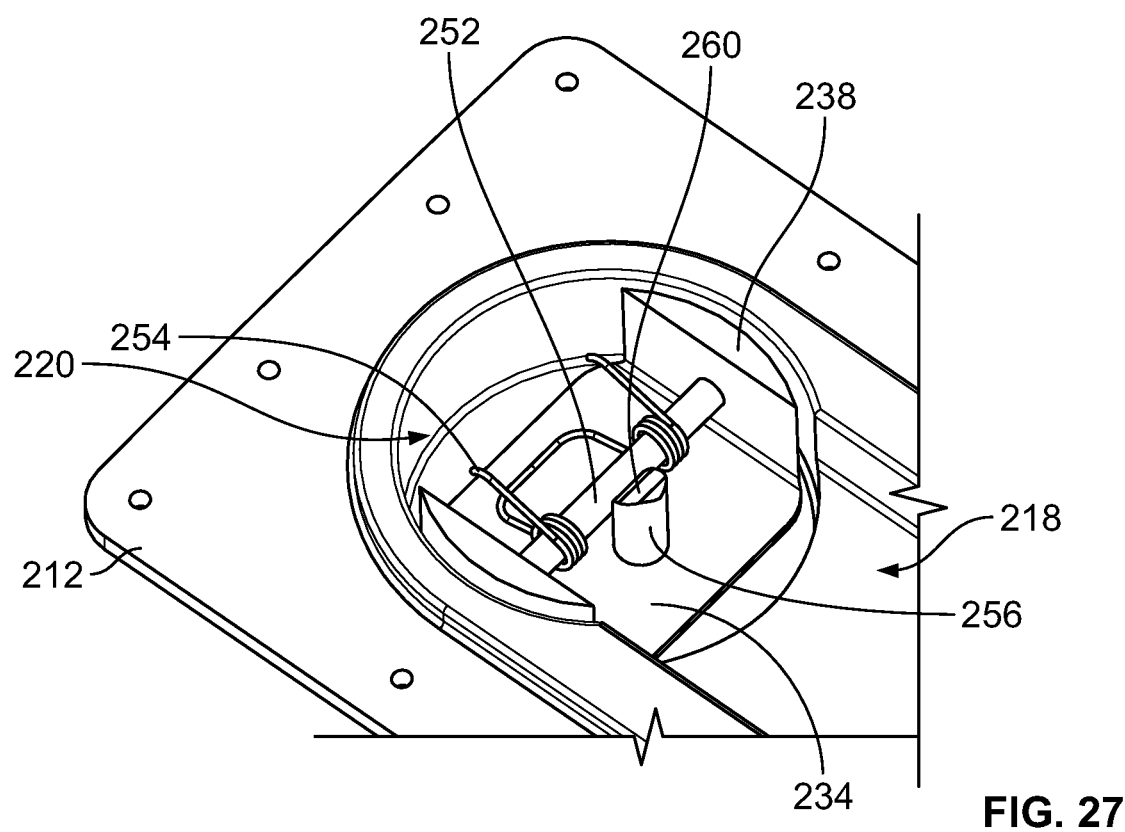
FIG. 27 is a top perspective view of a handle drive assembly employed by the door handle shown in FIG. 25, an outside handle employed by the door handle having been removed in FIG. 27 to expose and illustrate the handle drive assembly.

Referring now to FIGS. 25 through 27, to operate the door handle 210 from the outside and to open it from its closed position, the outside handle 222 is pushed and tilted out of the niche 218 of the housing 212 (e.g., by pushing inward on the end of the outside handle proximate the recess 220 of the housing 212) and is rotated counterclockwise about the longitudinal axis 240 to drive the gear drive 234 until the outside handle 222 stops (i.e., until a first portion of the stop pin slot 278 contacts the stop pin 244), thereby driving the gear 242 of the gear drive 234. To close the door handle 210 from its open position, the outside handle 222 is rotated clockwise until stopped (i.e., until a second portion of the stop pin slot 278 contacts the stop pin 244), and the outside handle 222 is released. Once the outside handle 222 has been released, the biasing action of the torsion spring 254 returns the outside handle 222 to its resting position within the niche 218 of the housing 212.

In an embodiment, the inside handle 232 can only be rotated and operated when the button 256 is pushed as described above. This is the case because, when the button 256 is in its resting position, the outside handle 222 is biased to a position within the niche 218 of the housing 212 by the torsion spring 254, and remains so positioned unless manipulated by a user (i.e., unless the button 256 is depressed); when positioned within the niche 218 of the housing 212, the outside handle 222 is constrained from rotation. Therefore, because the outside handle 222 must rotate with the inside handle 232 and the outside handle 222 is, by default, constrained from rotation, the inside handle 232 can only be rotated when the button 256 is pushed.

It should be understood that the embodiments described herein are merely exemplary in nature and that a person skilled in the art may make many variations and modifications thereto without departing from the scope of the present invention. All such variations and modifications, including those discussed above, are intended to be included within the scope of the invention.

What is claimed is:

1. A handle mechanism, comprising:
    a housing having an interior side, an exterior side opposite said interior side, a niche formed in said exterior side, a recess formed in said exterior side at a first end of said niche, and a hole extending through said housing at said recess;
    a gear drive having an interior end, an exterior end opposite said interior end, a longitudinal axis extending from said interior end to said exterior end, a peripheral surface, and a gear formed within said peripheral surface, said exterior end being positioned with said hole of said housing and positioned in said recess of said housing, said gear drive being positioned such that said longitudinal axis is perpendicular to said exterior side of said housing;
    an inside handle fixed to said interior end of said gear drive;
    a button disposed within said gear drive and oriented along said longitudinal axis of said gear drive, said button having an interior end and an exterior end opposite said interior end of said button, said interior end of said button extending through said inside handle, said exterior end of said button extending through said exterior end of said gear drive, said button being slidably movable along said longitudinal axis of said gear drive between a first position and a second position;
    a finger fixed to said exterior end of said button;
    a handle drive positioned within said exterior end of said gear drive and coaxially with said longitudinal axis of said gear drive, said handle drive being positioned with respect to said gear drive so as to be rotatable relative to said gear drive about said longitudinal axis of said gear drive but constrained from other motion relative to said gear drive by the positioning of said handle drive within said gear drive;
    an outside handle fixed to said handle drive such that rotation of one of said outside handle and said handle drive about said longitudinal axis of said gear drive causes corresponding rotation of the other one of said outside handle and said handle drive about said longitudinal axis of said gear drive, said outside handle being movable between a first position, in which said outside handle is positioned within said niche of said housing, and a second position, in which said outside handle is positioned externally of said niche of said housing, wherein when said outside handle is positioned within said niche of said housing, said outside handle is constrained from rotation about said longitudinal axis of said gear drive, thereby correspondingly constraining said handle drive from rotation about said longitudinal axis of said gear drive; and
    a spring attached to said button so as to bias said button toward said first position of said button, said spring further being attached to said outside handle so as to bias said outside handle toward said first position of said outside handle, and
    wherein, when said button is in its said first position, said finger is engaged with said gear drive and said handle drive such that rotation of one of said gear drive and said handle drive about said longitudinal axis causes corresponding rotation of the other one of said gear drive and said handle drive about said longitudinal axis, thereby allowing said handle mechanism to be operated by rotation of said outside handle, and when said button is in its said second position, said finger is disengaged from said handle drive such that rotation of said gear drive about said longitudinal axis does not cause corresponding rotation of said handle drive about said longitudinal axis, thereby allowing said handle mechanism to be operated by rotation of said inside handle.

2. The handle mechanism of claim 1, wherein said gear of said gear drive is adapted to drive a door mechanism.

3. The handle mechanism of claim 1, wherein said outside handle includes a pin hole, and wherein said outside handle is fixed to said handle drive by a pin fixed to said handle drive and passing through said pin hole of said outside handle.

4. The handle mechanism of claim 3, wherein said outside handle is rotatable about said pin to move between said first position of said outside handle and said second position of said outside handle.

5. The handle mechanism of claim 3, wherein said outside handle includes an interior surface, an exterior surface opposite said interior surface, and a button hole extending from said interior surface to said exterior surface, said button hole and said pin hole being positioned so as not to intersect one another.

6. The handle mechanism of claim 5, wherein said exterior end of said button passes through said button hole of said outside handle such that when said button is in its said first position, said exterior end of said button is flush with said exterior surface of said outside handle, and such that when said button is in its said second position, said exterior end of said button protrudes past said exterior surface of said outside handle.

7. The handle mechanism of claim 6, wherein said exterior end of said button is colored so as to provide a visual indication that said button is in its said second position.

8. The handle mechanism of claim 1, wherein said housing includes a stop positioned in such a manner so as to define an allowable range of rotation of said handle drive about said longitudinal axis of said gear drive with respect to said housing.

9. The handle mechanism of claim 8, wherein said allowable range of rotation of said handle drive extends from a first position, in which a first portion of said handle drive abuts said stop of said housing, to a second position, in which a second portion of said handle drive abuts said stop of said housing.

10. The handle mechanism of claim 9, wherein, when said handle drive is positioned in its said first position, said handle drive and said finger cooperate to position said gear drive in an open position, and when said handle drive is positioned in its said second position, said handle drive and said finger cooperate to position said gear drive in a closed position.

11. The handle mechanism of claim 1, wherein said handle drive includes a stop positioned in such a manner so as to define an allowable rotation of said gear drive about said longitudinal axis of said gear drive with respect to said handle drive.

12. The handle mechanism of claim 11, wherein said allowable range of rotation of said gear drive extends from a first position, in which a first portion of said gear drive abuts said stop of said handle drive, to a second position, in which a second portion of said gear drive abuts said stop of said handle drive.

13. The handle mechanism of claim 12, wherein when said gear drive is in its said first position, said gear of said gear drive is in an open position, and when said gear drive is in its said second position, said handle drive and said gear drive cooperate to position said gear of said gear drive in one of said open position and a closed position.

* * * * *